United States Patent
Pan et al.

(10) Patent No.: US 9,689,739 B2
(45) Date of Patent: Jun. 27, 2017

(54) MICROELECTROMECHANICAL SYSTEMS SENSOR CONTROL INTERFACE

(71) Applicant: INVENSENSE, INC., San Jose, CA (US)

(72) Inventors: Yang Pan, Shanghai (CN); Olafur Josefsson, Hafnarfjordur (IS)

(73) Assignee: INVENSENSE, INC., San Jose, CA (US)

( * ) Notice: Subject to any disclaimer, the term of this patent is extended or adjusted under 35 U.S.C. 154(b) by 461 days.

(21) Appl. No.: 14/303,838

(22) Filed: Jun. 13, 2014

(65) Prior Publication Data

US 2015/0362362 A1    Dec. 17, 2015

(51) Int. Cl.
*H04R 3/00* (2006.01)
*G01H 11/06* (2006.01)

(52) U.S. Cl.
CPC .............. *G01H 11/06* (2013.01); *H04R 3/00* (2013.01)

(58) Field of Classification Search
CPC ...................................... G01H 11/06
See application file for complete search history.

(56) References Cited

U.S. PATENT DOCUMENTS

| | | | | |
|---|---|---|---|---|
| 2013/0058495 | A1* | 3/2013 | Furst | H04R 3/00 381/80 |
| 2013/0287231 | A1* | 10/2013 | Kropfitsch | H02M 3/073 381/113 |
| 2014/0254837 | A1* | 9/2014 | Mortensen | H03F 3/187 381/120 |
| 2014/0270261 | A1* | 9/2014 | Wiesbauer | H03M 1/60 381/111 |

* cited by examiner

*Primary Examiner* — Muhammad N Edun
(74) *Attorney, Agent, or Firm* — Amin, Turocy & Watson, LLP

(57) ABSTRACT

Microelectromechanical (MEMS) sensors and control interfaces, control, interface components, protocols, systems, and methods are described. An exemplary control interface can comprise one or more predefined symbols that facilitate control of a MEMS sensor over an existing pin of a package comprising one or more MEMS sensors. Provided implementations described read/write protocols that enable reading and/or writing internal registers associated with MEMS sensors and/or other electronic components or portions thereof. Embodiments of the subject disclosure can provide flexible and reusable control interfaces for MEMS sensors and associated protocols.

24 Claims, 19 Drawing Sheets

MICROELECTROMECHANICAL SYSTEMS SENSOR CONTROL INTERFACE

TECHNICAL FIELD

The subject disclosure relates to microelectromechanical systems (MEMS) sensors and more particularly to control interfaces, protocols, devices, systems, and methods therefor.

BACKGROUND

Conventionally, microelectromechanical systems (MEMS) sensors employ a MEMS transducer to convert physical phenomena to an electrical signal. As an example, in the context of a MEMS acoustic sensor, a response of the MEMS transducer to an acoustic pressure change is typically a function of the mechanical parameters of the MEMS transducer. A MEMS sensor can also have other variations in addition to those that are a function of the mechanical parameters of the MEMS transducer, which can, in general, be relatively smaller. Thus, a measure of a physical parameter by the MEMS transducer of the MEMS sensor can vary widely in voltage, for example, as a result of variations in mechanical parameters of the MEMS transducer. This can result in sub-optimal performance of the related MEMS sensor.

In an effort to minimize MEMS transducer yield loss in manufacturing due to large variations in the mechanical parameters of the MEMS transducer, programmable MEMS sensors can account for such variations in the mechanical parameters of the MEMS transducer. Moreover, the addition of programmable functionality and interfaces for MEMS sensors can provide for testing, observation, configuration, control, etc. of programmable MEMS sensors, which can further improve package test accuracy, reduce costs associated with test and sort, provide further advanced features set for MEMS sensors, etc. For instance, addition of programmable functionality and interfaces for MEMS sensors can compensate for variations in key MEMS sensor parameters, for example but not limited to, transducer sensitivity, signal to noise ratio (SNR), resonance frequency of the mechanical element of the transducer, and phase delay of the acoustic sensor, etc.

However, interface solutions for providing programmable functionality to MEMS sensors typically rely on slow, restrictive, complicated, and/or costly interfaces requiring additional MEMS sensor package design requirements. It is thus desired to provide MEMS sensor interfaces that improve upon these and other deficiencies. The above-described deficiencies are merely intended to provide an overview of some of the problems of conventional implementations, and are not intended to be exhaustive. Other problems with conventional implementations and techniques and corresponding benefits of the various aspects described herein may become further apparent upon review of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

In a non-limiting example, a device is provided comprising a package including a MEMS transducer associated with a clock signal and a register associated with the MEMS transducer, according to aspects of the subject disclosure. In addition, an exemplary device can comprise a pin of the package configured to transmit or receive a signal, wherein the pin is further configured to transmit or receive a control signal, and wherein the control signal is configured to control the MEMS transducer based on a determination of a control symbol included in the signal. In a non-limiting aspect, a determination of the control symbol can be based on detection of a pulse width of a pulse associated with the signal and the clock signal, wherein the pulse can be based on the signal being at a high value or low value for a dynamic number of cycles of the clock signal.

Moreover, exemplary methods are described. For instance, an exemplary method, in a non-limiting aspect, can comprise receiving a control signal at a package comprising a MEMS transducer that has an associated clock signal. For instance, the control signal can be received at a pin of the package configured to transmit or receive a signal in addition to receiving the control signal. Exemplary methods can further comprise determining whether a control symbol is included in the signal and performing an operation associated with the MEMS transducer based on the control symbol. In another aspect, determining whether a control symbol is included in the signal can include determining whether a start symbol, a stop symbol, a digital zero, or a digital one is included in the signal. In addition, exemplary methods can further comprise determining that the signal comprises a digital high signal or a digital low signal for a multiple of a pilot signal, wherein the pilot signal has a dynamic reference pulse width based on a predetermined number of cycles of the associated clock signal.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
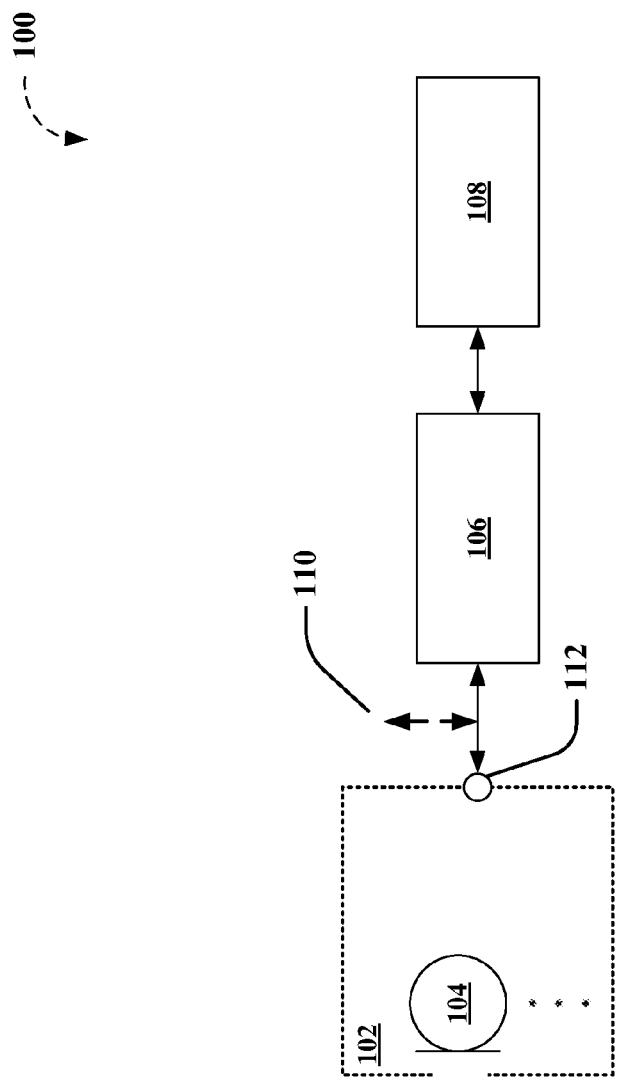
FIG. 1 depicts a non-limiting operating environment comprising exemplary microelectromechanical systems (MEMS) sensor, control interface component, and external controller, in which non-limiting aspects of the subject disclosure can be practiced.

While a brief overview is provided, certain aspects of the subject disclosure are described or depicted herein for the purposes of illustration and not limitation. Thus, variations of the disclosed embodiments as suggested by the disclosed apparatuses, systems, and methodologies are intended to be encompassed within the scope of the subject matter disclosed herein.

As used herein, microelectromechanical systems can refer to any of a variety of structures or devices fabricated using semiconductor-like processes and exhibiting mechanical characteristics such as the ability to move or deform. For instance, such structures or devices can interact with electrical signals. As a non-limiting example, a MEMS acoustic sensor can include a MEMS transducer and an electrical interface. In addition, MEMS structures or devices can include, but are not limited to, gyroscopes, accelerometers, magnetometers, pressure sensors, acoustic sensors or microphones, and radio-frequency components.

Silicon wafers comprising MEMS structures or devices can be referred to as MEMS wafers. In addition, MEMS structures or devices such as a MEMS transducer can be integrated with an associated electrical interface as single die, or as two or more separate dies, where a MEMS transducer and associated electrical interface can be interconnected via additional pins, bond wires, and so on. In addition, a MEMS sensor, such as a programmable MEMS sensor, for example, can be coupled to a host system via electrical interface pins. For example, an exemplary host system can comprise a testing platform employed during production, characterization, sort, etc. In another example, an exemplary host system can comprise a system processor and/or external device associated with the MEMS sensor, and/or an application processor of a device comprising or associated with the MEMS sensor such as a feature phone, smartphone, smart watch, tablet, eReader, netbook, automotive navigation device, gaming console or device, wearable computing device, global positioning system (GPS) device, and so on, without limitation.

As described above, the addition of programmable functionality and/or interfaces for MEMS sensors can provide for testing, observation, configuration, control, and so on of programmable MEMS sensors, which can further improve package test accuracy, reduce costs associated with test and sort, provide further advanced features sets of MEMS sensors, etc. For instance, addition of programmable functionality and interfaces for MEMS sensors can compensate for variations in key MEMS sensor parameters, for example but not limited to, transducer sensitivity, signal to noise ratio (SNR), resonance frequency of the mechanical element of the transducer, and phase delay of the acoustic sensor, etc.

However, interface solutions for providing programmable functionality to MEMS sensors typically rely on slow, restrictive, complicated, and/or costly interfaces requiring additional MEMS sensor package design requirements. As a non-limiting example, the Inter-Integrated Circuit ($I^2C$) interface, a two wire interface, supports a limited range of speeds, and the I2C bus drivers are "open drain." As another example, Serial Peripheral Interface (SPI), Integrated Interchip Sound ($I^2S$), and time-division multiplexing (TDM) can require four wires for communication whereas $I^2S$ is not suitable for non-$I^2S$ parts. As component and device designs proceed toward further integration, and as device and component sizes decrease, it is desirable to provide flexible and reusable control interfaces for a variety of existing and forthcoming MEMS sensors.

To these and/or related ends, various aspects of MEMS sensors, control interfaces, protocols, devices, systems, and methods therefor are described. For example, the various embodiments of the apparatuses, techniques, and methods of the subject disclosure are described in the context of control interfaces for one or more MEMS sensors. Exemplary embodiments of the subject disclosure provide flexible and reusable control interfaces for a variety of existing and forthcoming MEMS sensors that can reuse existing pins for communication with one or more of the MEMS sensors of a MEMS sensor package, while enabling write and read of internal registers associated with MEMS sensors. In addition, the subject disclosure enables changing of internal registers associated with MEMS sensors with minimum effect on normal operation, while occupying a small hardware footprint that can be integrated with application specific integrated circuits (ASIC) associated with one or more MEMS sensors in production, or that can be retrofitted to existing MEMS sensor designs. Accordingly, various aspects of MEMS sensors, control interfaces, protocols, devices, systems, and methods described herein can enable easy and efficient test and evaluation, without the need for employing a preamble or power cycling.

Various embodiments of the subject disclosure are described herein for purposes of illustration, and not limitation. For example, embodiments of the subject disclosure are described herein in the context of a MEMS acoustic sensor. However, it can be appreciated that the subject disclosure is not so limited. However, as further detailed below, various exemplary implementations can be applied to other areas of MEMS sensor design and/or packaging, without departing from the subject matter described herein.

For example, MEMS acoustic sensors, such as MEMS microphone, typically comprise or are associated with a clock signal (e.g., an external clock input for digital microphone such as ADMP521, ADMP441, etc., or an internal oscillator (OSC) to generate the clock for bias voltage ($V_{bias}$) generator for analog microphone such as ADMP504, etc.). Various embodiments of the subject disclosure can employ a clock signal, while repurposing an existing pin of a MEMS sensor as a control pin for use in exemplary control interfaces and associated protocols, as further described herein. In non-limiting aspects, repurposing an existing pin of a MEMS sensor as a control pin can reduce pin reuse and maintain normal MEMS sensor operation, while providing the ability to control MEMS sensor. For example, as further described below regarding FIGS. 1-5, an exemplary control pin can comprise an OUTPUT pin of an analog MEMS acoustic sensor, left/right select (L/R) pin for a pulse density modulation (PDM) digital MEMS acoustic sensor, configuration or L/R pin for an I²S/TDM digital MEMS acoustic sensor, etc. In addition, in a further non-limiting aspect, exemplary control interfaces can employ pulse-width detection, as described herein, regarding FIGS. 6-11, for example.

Exemplary Embodiments

Various aspects or features of the subject disclosure are described with reference to the drawings, wherein like reference numerals are used to refer to like elements throughout. In this specification, numerous specific details are set forth in order to provide a thorough understanding of the subject disclosure. It should be understood, however, that the certain aspects of disclosure may be practiced without these specific details, or with other methods, components, parameters, etc. In other instances, well-known structures, components, circuits, devices, and so on are shown in block diagram form to facilitate description and illustration of the various embodiments.

FIG. 1 depicts a non-limiting operating environment 100 comprising an exemplary MEMS sensor 102, which can comprise a MEMS transducer (e.g., a MEMS acoustic sensor 102 comprising MEMS transducer 104, etc.), a control interface component 106, and an external controller 108, in which non-limiting aspects of the subject disclosure can be practiced. For instance, as further described herein, MEMS sensor 102 can comprise, but are not limited to, gyroscopes, accelerometers, magnetometers, pressure sensors, acoustic sensors or microphones, and radio-frequency components.

Conventional MEMS sensor 102 can comprise MEMS transducer 104 coupled to components and/or circuitry for sensor signal conditioning, which in turn, can be coupled to an output pin of a package comprising MEMS sensor 102. In addition, MEMS sensor 102 can further comprise one or more registers coupled to the MEMS transducer 104 and the components and/or circuitry for sensor signal conditioning.

Some of the one or more registers can be employed to control different functions of the MEMS sensor 102, such as, for example, trim and test functions built into components and/or circuitry for sensor signal conditioning, which, in turn, can process an output from the MEMS transducer 104 and can produce a MEMS sensor output. MEMS sensor 102 can also comprise other components and/or circuitry, such as, for example, components and/or circuitry for internal voltage regulation, multiplexing and/or demultiplexing of signals, etc.

Control interface component 106 is depicted external to a package comprising MEMS sensor 102, but as further described herein, control interface component 106 can be included in a package comprising MEMS sensor 102, can include or be integrated, in whole or in part, with an ASIC associated with MEMS sensor 102, and/or portions thereof. As further described herein, control interface component 106 can provide flexible and reusable control interfaces for a variety of MEMS sensors 102, for example, by reusing existing pins for communication with one or more of the MEMS sensors of a MEMS sensor package (e.g., package comprising MEMS sensor 102 and/or one or more other MEMS sensors), while enabling write and read of internal registers associated with MEMS sensors.

In the exemplary operating environment 100, the control interface component 106 is depicted as connected via a signal 110 line to existing pin 112 for communication with one or more of the MEMS sensors of a MEMS sensor package (e.g., package comprising MEMS sensor 102). For instance, as further described herein, an existing pin 112 can provide an exemplary control pin for receiving control signals, such as can be the case for an OUTPUT pin of an analog MEMS acoustic sensor, L/R pin for a PDM digital MEMS acoustic sensor, configuration or L/R pin for an I²S/TDM digital MEMS acoustic sensor, etc.

As further described herein, exemplary control interface component 106 can comprise one or more of an interface component configured to receive a control signal associated with MEMS sensor 102, a processing component configured to determine whether a control symbol is present in the control signal based on a width of a pulse associated with the control signal and a clock signal associated with MEMS sensor 102, and a controller component configured to control operations related to MEMS sensor 102 based on the control symbol, for example, as further described herein. For example, an exemplary interface component can comprise components and/or circuitry for data and/or clock conditioning, which can facilitate, for example, conditioning signals for digital data signaling. As a further non-limiting example, an exemplary processing component can comprise processing functionality provided by one or more of a microcontroller (MCU), a digital signal processor (DSP), a field programmable gate array (FPGA), and/or an ASIC, and/or portions or combinations thereof. In further non-limiting examples, an exemplary controller component can be coupled between one or more of an exemplary interface component and/or an exemplary processing component and the one or more registers coupled to the MEMS transducer 104.

In addition, exemplary control interface component 106 can further comprise or be associated with a storage component (e.g., comprising a memory such as a nonvolatile memory, one or more registers, etc.) configured to, for example, store a dynamic reference pulse width to facilitate a determination of whether the control symbol is included in the control signal, for example, where the dynamic reference pulse width can be employed in MEMS sensor control interfaces and associated protocols based on pulse-width detection, as further described herein. As further described herein, one or more of exemplary interface component, processing component, control component, and/or storage component, and/or portions or combinations thereof can be included in a package comprising MEMS sensor 102, and can include or be integrated, in whole or in part, with an ASIC and/or components and/or circuitry associated MEMS sensor 102, and/or portions thereof.

As described, non-limiting operating environment 100 can comprise an exemplary an external controller 108. According to non-limiting aspects, exemplary external controller 108 can be included in an exemplary host system that can comprise a testing platform employed during production, characterization, sort, etc., a system processor and/or external device associated with MEMS sensor 102, and/or an application processor of a device comprising or associated with MEMS sensor 102 such as a feature phone, smartphone, smart watch, tablet, eReader, netbook, automotive navigation device, gaming console or device, wearable computing device, GPS device, and so on, without limitation. Accordingly, a host system comprising exemplary external controller 108 can comprise test equipment, another sensor, a digital signal processor, an application processor, a sensor hub, a coder-decode (codec), and/or the like.

Accordingly, exemplary external controller 108 can comprise one or more of a controller component configured to generate a control symbol in a control signal associated with MEMS sensor 102 (e.g., a control signal based on a pulse having a pulse width associated with a clock signal related to MEMS sensor 102), a transmission component configured to transmit the control signal to MEMS sensor 102 on a pin 112 of a package comprising MEMS sensor 102 and configured to a transmit or receive another signal 110 in addition to signals associated with the control signal, for example, as further described herein. In addition, exemplary external controller 108 can also comprise a communications component configured to receive or transmit data from or to one or more registers associated with MEMS sensor 102 based on the control symbol. Further non-limiting implementations of exemplary external controller 108 can also comprise a storage component configured to store a dynamic reference pulse width to facilitate generation of the pulse, where the dynamic reference pulse width can be employed in MEMS sensor control interfaces and associated protocols based on pulse-width detection, as further described herein.

For example, one or more of an exemplary controller component, transmission component, communications component, and/or a storage component, and/or portions thereof can comprise processing or other functionality provided by one or more of an MCU, a DSP, an FPGA, and/or an ASIC, and/or portions thereof. In addition, as further described herein, one or more of exemplary controller component, transmission component, communications component, and/or a storage component, and/or portions or combinations thereof can be included in a device or system comprising or associated with MEMS sensor 102, and can include or be integrated, in whole or in part, with an MCU, a DSP, an FPGA, and/or an ASIC, and/or portions, components, and/or circuitry associated with device or system comprising or associated with MEMS sensor 102, and/or portions thereof.

Accordingly, exemplary MEMS sensor 102 can receive data and/or instructions from exemplary external controller 108, via existing pin 112 configured as a control pin by, for example, control interface component 106, according to exemplary control interfaces and associated protocols as described herein. Thus, the subject disclosure provides exemplary control interfaces and associated protocols that can facilitate one or more of identification, testing, programming, observation, configuration, control, and/or compensating of one or more MEMS sensors included in a package, for example, as further described herein.

As a non-limiting example, one or more control symbols can be predefined based on the width of a pulse of a signal on a control pin (e.g., existing pin 112), such that a dynamic reference pulse width of a pilot signal can be employed in MEMS sensor control interfaces and associated protocols, where the width of a pulse determined by pulse-width detection can be employed to define the control symbols employed in the protocol associated with the control interface, as further described herein. In a non-limiting aspect, except for knowledge of a clock signal, a singular control pin (e.g., existing pin 112) can be sufficient to enable information transfer and/or control associated with MEMS sensor 102, as provided by various embodiments described herein. Accordingly, in non-limiting embodiments, the information transfer can be bidirectional, where high level pulse width of a signal on the control pin (e.g., existing pin 112) can be employed to define the communication protocol, for example, as further described herein.

According to further non-limiting aspects, MEMS sensor control interfaces and associated protocols can facilitate flexible and reusable control interfaces and associated protocols for one or more MEMS sensors (not shown), in addition to MEMS sensor 102, whether included or integrated, in whole or in part, with MEMS sensor 102, and/or portions thereof. As a non-limiting example, exemplary control interfaces and associated protocols can facilitate addressing one or more devices, as described herein.

Figure 2:
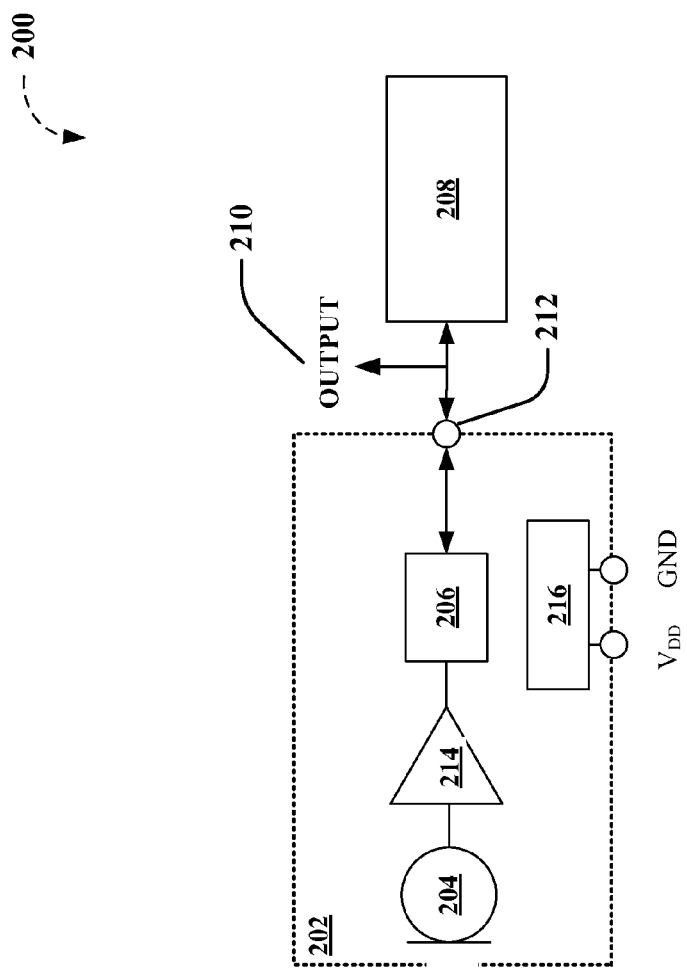
FIG. 2 depicts aspects of a non-limiting embodiment comprising a control interface component in the context of an analog MEMS sensor.

As an example, FIG. 2 depicts aspects of a non-limiting embodiment comprising a control interface component in the context of an analog MEMS sensor (e.g., an ADMP504 analog MEMS acoustic sensor). For example, as with FIG. 1 above, non-limiting embodiment 200 can comprise a MEMS transducer (e.g., an analog MEMS acoustic sensor 202 comprising MEMS transducer 204, etc.), and a control interface component 206, for example. Further non-limiting embodiments 200 can also comprise an external controller 208, for example, as further described above regarding FIG. 1. Exemplary control interface component 206 is depicted coupled to a signal 210 line via existing pin 212 for communication of one or more of the MEMS sensors of a MEMS sensor package (e.g., package comprising analog MEMS acoustic sensor 202), for example, with external controller 208. For instance, an existing pin 212 can provide a control pin for receiving control signals and can comprise an OUTPUT pin of an analog MEMS acoustic sensor 202.

In addition, analog MEMS acoustic sensor 202 comprising MEMS transducer 204 is depicted comprising an output amplifier 214, coupled to control interface component 206, and power management component 216 coupled to power ($V_{DD}$) and ground (GND) pins. In a non-limiting aspect, an analog MEMS acoustic sensor 202 comprising MEMS transducer 204 can include an internally generated clock or an internal OSC to generate the clock (e.g., for a bias voltage ($V_{bias}$) generator), which is not externally controlled. Accordingly, non-limiting embodiments of the subject disclosure can provide an asynchronous data transfer protocol, for example, in connection with control interfaces and associated protocols in the context of analog MEMS acoustic sensor 202. Further non-limiting embodiments of the subject disclosure described herein can provide an synchronous data transmission protocol in connection with control interfaces and associated protocols in the context of digital MEMS acoustic sensors, for example.

Also typical frequency variance of OSC associated with an analog MEMS acoustic sensor 202 can be relatively large (e.g., having an expected maximum/minimum ratio of about six to one). Accordingly, the one or more predefined control symbols based on the width of a pulse of a signal on a control pin (e.g., existing pin 212) and a dynamic reference pulse width of a pilot signal employed in MEMS sensor control interfaces and associated protocols for analog MEMS acoustic sensor 202 can accommodate the frequency variance of OSC associated with an analog MEMS acoustic sensor 202, for example, as further described herein, regarding FIG. 6. In a further non-limiting aspect, a safe pulse width can be provided to differentiate disparate control symbols, for example, as further described herein, regarding FIG. 6. Accordingly, various non-limiting embodiments as described herein that employ a dynamic reference pulse width can accommodate expected frequency variance of OSC associated with an analog MEMS acoustic sensor 202, while reducing test and/or programming time as compared with a control interface and associated protocols based on a fixed pulse width detection method.

Thus, for non-limiting embodiments of analog MEMS acoustic sensor 202 comprising control interface component 206, after applying power to analog MEMS acoustic sensor 202 at VDD, a signal 210 on, existing pin 212 (e.g., OUTPUT pin of analog MEMS acoustic sensor 202) can work for a predetermined interval as a digital input, waiting for $V_{bias}$ to stabilize. During this predetermined interval, if control of analog MEMS acoustic sensor 202 is desired, a control signal comprising one or more predefined control symbols, based on the width of a pulse of the signal on the control pin (e.g., existing pin 212) and a dynamic reference pulse width of a pilot signal, can be written (e.g., by external controller 208, etc.) to existing pin 212 (e.g., OUTPUT pin of analog MEMS acoustic sensor 202), and/or determined by control interface component 206, in connection with exemplary MEMS sensor control interfaces and associated protocols for analog MEMS acoustic sensor 202, as described herein. In response to the one or more predefined control symbols written to and/or determined to exist on existing pin 212 (e.g., OUTPUT pin of analog MEMS acoustic sensor 202), MEMS acoustic sensor 202 can enter into a test, configuration, or other mode, as prescribed by the exemplary control interfaces and associated protocols. If no control signal comprising one or more predefined control symbols is written and/or determined during this predetermined interval (e.g., while the $V_{bias}$ is stable, etc.), the signal 210 on existing pin 212 (e.g., OUTPUT pin of analog MEMS acoustic sensor 202) can perform as per normal operation of analog MEMS acoustic sensor 202 (e.g., as an analog output, etc.).

What has been described above, regarding FIG. 2, relates to non-limiting embodiments employing exemplary control interfaces and associated protocols for one or more MEMS sensors reusing an existing pin 212 (e.g., OUTPUT pin of analog MEMS acoustic sensor 202). In further non-limiting embodiments of analog MEMS acoustic sensors 202, exemplary control interfaces, components, and associated protocols can employ an additional CONFIG pin (not shown), which can provide communication with the analog MEMS acoustic sensor 202, at any time, with no influence to normal operations. In still further non-limiting embodiments of analog MEMS acoustic sensors 202, an additional CONFIG pin (not shown) could be employed with an internal low dropout (LDO) voltage regulator to facilitate switching the low power modes (e.g., instead of changing $V_{DD}$), which can additional reduce complexity compared to MEMS sensor designs employing voltage switching. In addition, while control interface component 206 is depicted connected in series with output amplifier 214 and existing pin 212, it can be appreciated that control interface component 206 can be connected in parallel with output amplifier 214, for example, as demonstrated below regarding FIGS. 3-5.

Figure 3:
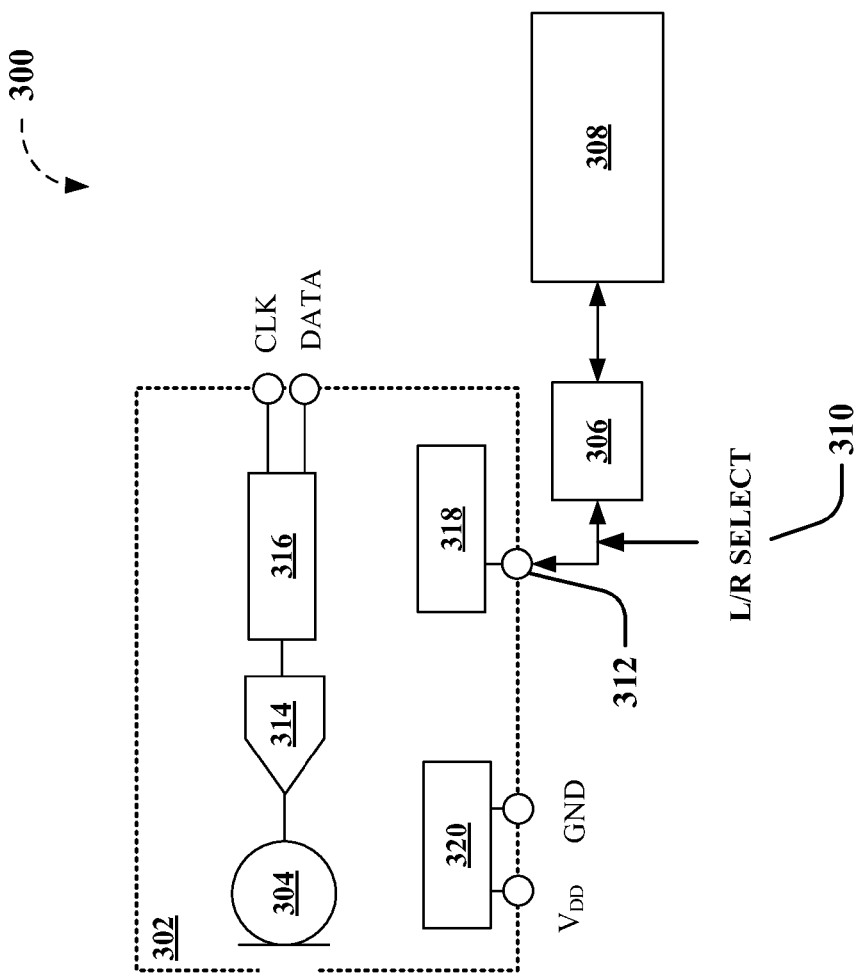
FIG. 3 depicts aspects of a further non-limiting embodiment comprising a control interface component in the context of a digital MEMS sensor comprising a pulse density modulation output.
Figure 4:
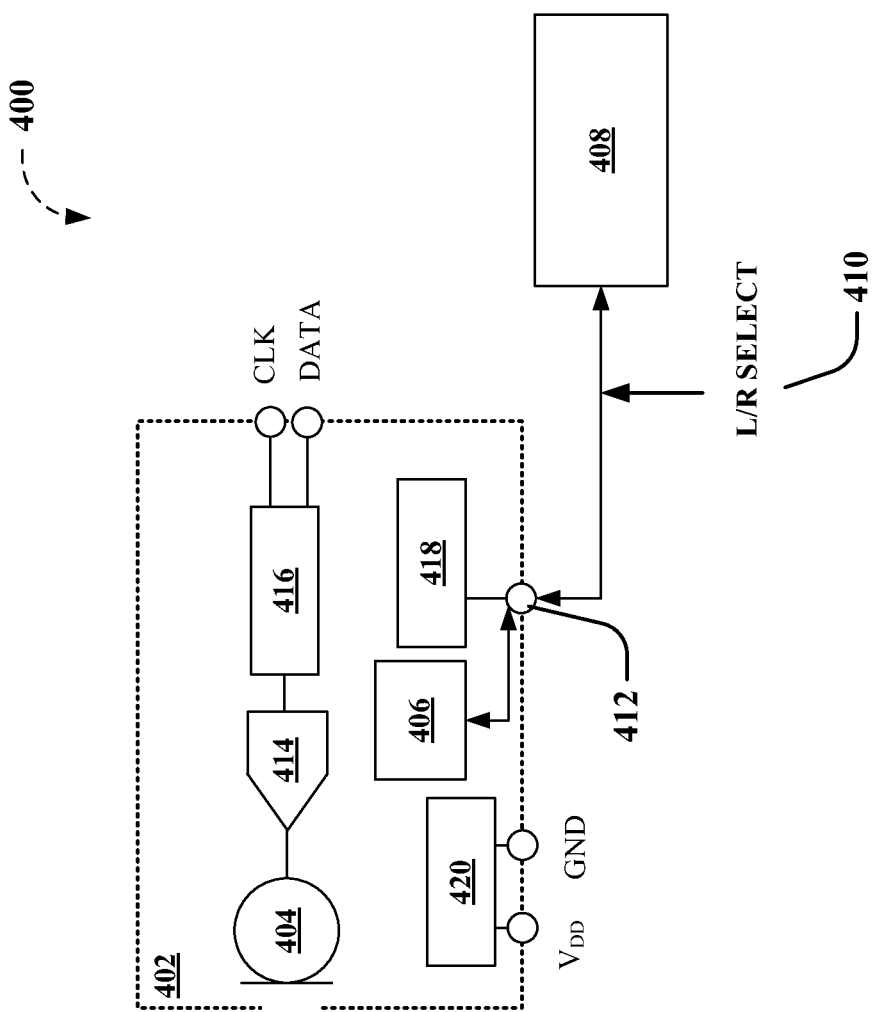
FIG. 4 depicts aspects of another exemplary implementation comprising a control interface component in the context of a digital MEMS sensor comprising a pulse density modulation output.

FIGS. 3-4 depict aspects of further non-limiting embodiments comprising control interface components in the context of a digital MEMS sensor (e.g., an ADMP521 digital MEMS acoustic sensor) comprising a pulse density modulation output. For example, FIG. 3 depicts aspects of an exemplary implementation 300 comprising a control interface component in the context of, and external to, a digital MEMS sensor 302 comprising a pulse density modulation output, whereas FIG. 4 depicts aspects of another exemplary implementation 400 comprising a control interface component in the context of, and internal to, a digital MEMS sensor 402 comprising a pulse density modulation output. Thus, as with FIGS. 1-2 above, non-limiting embodiment 300/400 can comprise a MEMS transducer (e.g., a digital MEMS acoustic sensor 302/402 comprising MEMS transducer 304/404, etc.), and a control interface component 306/406, for example. Further non-limiting embodiments 300/400 can also comprise an external controller 308/408, for example, as further described above regarding FIG. 1.

Exemplary control interface component 306/406 is depicted coupled to a signal 310/410 line via existing pin 312/412 for communication of one or more of the MEMS sensors of a MEMS sensor package (e.g., package comprising digital MEMS sensor acoustic 302/402), for example, with external controller 308/408. For instance, an existing pin 312/412 can provide a control pin for receiving control signals and can comprise an L/R select pin of a digital MEMS acoustic sensor 302/402. In addition, exemplary digital MEMS acoustic sensor 302/402 comprising MEMS transducer 304/404 is depicted comprising an analog-to-digital converter (ADC) 314/414 coupled to a PDM modulator 316/416 that receives an external clock (CLK) signal and provides a digital data (DATA) output signal of digital MEMS acoustic sensor 302/402, a channel select component 318/418 coupled to control interface component 306/406 at a control pin comprising existing pin 312/412 (e.g., L/R select pin of digital MEMS acoustic sensor 302/402), and a power management component 320/420 coupled to $V_{DD}$ and GND pins associated with digital MEMS acoustic sensor 302/402.

In non-limiting embodiments 300/400 of FIGS. 3-4 the digital output signal (DATA) can also provide a digital MEMS acoustic sensor 302/402 output to a host system (e.g., comprising external controller 308/408, or otherwise, etc.). As a non-limiting example, the digital output signal (DATA) can comprise a PDM acoustic sensor output or the like. In addition, in non-limiting aspects of exemplary embodiments 300/400 of FIGS. 3-4, exemplary control interfaces and associated protocols as described herein in connection with a control pin comprising existing pin 312/412 (e.g., L/R select pin of digital MEMS acoustic sensor 302/402) can provide control interfaces to one or more digital MEMS sensors such as digital MEMS acoustic sensor 302/402 with no influence to digital MEMS acoustic sensor 302/402, during normal operations.

For example, during normal operation of digital MEMS acoustic sensor 302/402, a control pin comprising existing pin 312/412 (e.g., L/R select pin of digital MEMS acoustic sensor 302/402) is conventionally held low or high. Thus, until and unless a control signal comprising a control symbol as described herein is written (e.g., by external controller 308/408, etc.) to existing pin 312/412 (e.g., L/R select pin of digital MEMS acoustic sensor 302/402), and/or determined by control interface component 306/406, in connection with exemplary MEMS sensor control interfaces and associated protocols for digital MEMS acoustic sensor 302/402, normal operation for digital MEMS acoustic sensor 302/402 holding existing pin 312/412 (e.g., L/R select pin) low or high would not invoke a register read/write operation. When communication with digital MEMS acoustic sensor 302/402 is desired, one or more predefined control symbols can be written to and/or determined to exist on existing pin 312/412 (e.g., L/R select pin of digital MEMS acoustic sensor 302/402), digital MEMS acoustic sensor 302/402 can enter into a test, configuration, or other mode, as prescribed by the exemplary control interfaces and associated protocols. As described above regarding FIG. 2, non-limiting embodiments 300/400 of the subject disclosure described herein can provide an synchronous data transmission protocol in connection with control interfaces and associated protocols in the context of digital MEMS acoustic sensors, for example. As described above regarding FIG. 2, while control interface component 306 is depicted connected in series with channel select component 318 and existing pin 312, it can be appreciated that control interface component 306 can be connected in parallel with channel select component 318, for example, as demonstrated regarding control interface component 406, channel select component 418, and existing pin 412 of FIG. 4. Furthermore, control interface component 306 can also be connected in parallel (not shown) with existing pin 312 while remaining external to digital MEMS acoustic sensor 302.

Figure 5:
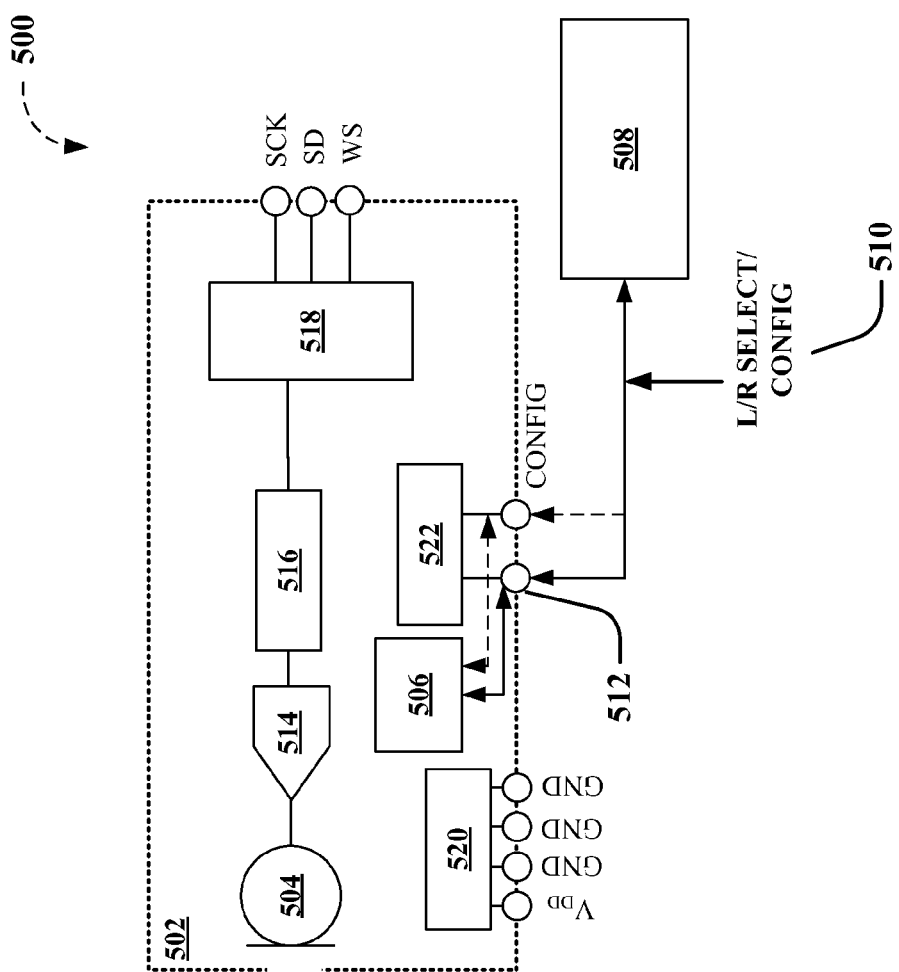
FIG. 5 depicts a further non-limiting embodiment comprising a control interface component in the context of a digital MEMS sensor comprising an Integrated Interchip Sound ($I^2S$) output, according to aspects of the subject disclosure.

FIG. 5 depicts a further non-limiting embodiment comprising a control interface component in the context of a digital MEMS sensor (e.g., an ADMP441 digital MEMS acoustic sensor) comprising an I²S output, according to aspects of the subject disclosure. Thus, as with FIGS. 1-4 above, non-limiting embodiment 500 can comprise a MEMS transducer (e.g., a digital MEMS acoustic sensor 502 comprising MEMS transducer 504, etc.), and a control interface component 506, for example. Further non-limiting embodiments 500 can also comprise an external controller 508, for example, as further described above regarding FIG. 1.

Exemplary control interface component 506 is depicted coupled to a signal 510 line via existing pin 512 for communication of one or more of the MEMS sensors of a MEMS sensor package (e.g., package comprising digital MEMS sensor acoustic 502), for example, with external controller 508. For instance, an existing pin 512 can provide a control pin for receiving control signals and can comprise an L/R select pin of a digital MEMS acoustic sensor 502. In other non-limiting embodiments, an alternative existing pin can provide a control pin for receiving control signals and can comprise a CONFIG pin of a digital MEMS acoustic sensor 502. In addition, exemplary digital MEMS acoustic sensor 502 comprising MEMS transducer 504 is depicted comprising an ADC 514 coupled to an anti-aliasing filter 516 and I²S serial port 518 that receives an I²S serial data clock (SCK) signal and provides an I²S serial digital data (SD) output signal of digital MEMS acoustic sensor 502 and I²S serial data word select (WS), a power management component 520 coupled to $V_{DD}$ and GND pins associated with digital MEMS acoustic sensor 502, and a hardware control component 522 coupled to control interface component 506 at a control pin comprising existing pin 512 (e.g., L/R select pin of digital MEMS acoustic sensor 502) or CONFIG pin of digital MEMS acoustic sensor 502.

In non-limiting embodiments 500 of FIG. 5 the I²S SD output signal of digital MEMS acoustic sensor 502 can also provide a digital MEMS acoustic sensor 502 output to a host system (e.g., comprising external controller 508, or otherwise, etc.). As a non-limiting example, the I²S SD output signal can comprise a digital acoustic sensor output that can be coupled directly to digital processors, such as DSPs and microcontrollers, without the need for an audio codec. In addition, in non-limiting aspects of exemplary embodiments 500 of FIG. 5, exemplary control interfaces and associated protocols as described herein in connection with a control pin comprising existing pin 512 (e.g., L/R select pin of digital MEMS acoustic sensor 502) or CONFIG pin of digital MEMS acoustic sensor 502 can provide control interfaces to one or more digital MEMS sensors such as digital MEMS acoustic sensor 502 with no influence to digital MEMS acoustic sensor 502, during normal operations.

For example, during normal operation of digital MEMS acoustic sensor 502, a control pin comprising existing pin 512 (e.g., L/R select pin of digital MEMS acoustic sensor 502) or CONFIG pin of digital MEMS acoustic sensor 502 is conventionally held low or high. In addition, a control pin comprising CONFIG pin of digital MEMS acoustic sensor 502 is conventionally held low for I²S operation of digital MEMS acoustic sensor 502 or high TDM operation of digital MEMS acoustic sensor 502. Thus, an exemplary control interface could remain fixed to I²S or TDM for a predetermined number of cycles after power up.

Accordingly, until and unless a control signal comprising a control symbol as described herein is written (e.g., by external controller 508, etc.) to existing pin 512 (e.g., L/R select pin of digital MEMS acoustic sensor 502) or CONFIG pin of digital MEMS acoustic sensor 502, and/or determined by control interface component 506, in connection with exemplary MEMS sensor control interfaces and associated protocols for digital MEMS acoustic sensor 502, normal operation for digital MEMS acoustic sensor 502 holding existing pin 512 (e.g., L/R select pin) or CONFIG pin of digital MEMS acoustic sensor 502 low or high would not invoke a register read/write operation. After the predetermined number of cycles after power up and when communication with digital MEMS acoustic sensor 502 is desired, one or more predefined control symbols can be written to and/or determined to exist on existing pin 512 (e.g., L/R select pin of digital MEMS acoustic sensor 502) or CONFIG pin of digital MEMS acoustic sensor 502, digital MEMS acoustic sensor 502 can enter into a test, configuration, or other mode, as prescribed by the exemplary control interfaces and associated protocols. As described above regarding FIGS. 2-4, non-limiting embodiments 500 of the subject disclosure described herein can provide an synchronous data transmission protocol in connection with control interfaces and associated protocols in the context of digital MEMS acoustic sensors, for example.

Figure 6:
FIG. 6 tabulates exemplary control symbols and associated signal characteristics that can be practiced by various non-limiting embodiments of the subject disclosure.

FIG. 6 tabulates 600 exemplary control symbols and associated signal characteristics that can be practiced by various non-limiting embodiments of the subject disclosure. For example, FIG. 6 presents exemplary control symbols 602 and associated signal characteristics 604 in the general case for exemplary control interfaces as described herein, regarding FIGS. 1-5, for example, whereas exemplary control symbols 606 and associated signal characteristics 608 are presented in the particular context of digital MEMS sensors capable of synchronous data transmission protocols for exemplary control interfaces as described herein, regarding FIGS. 3-5.

Accordingly, one or more control symbols 602 can comprise one or more of a predefined start symbol, a stop symbol, a digital one, and/or a digital zero. Thus, an exemplary control symbol 602, comprising a start symbol, can have associated signal characteristics 604, such that a pilot signal can have a predetermined dynamic reference pulse width greater than two clock cycles high (to provide a measure of robustness) and less than or equal to 255 clock cycles high (e.g., pilot_max=255 clock cycles). Likewise, an exemplary control symbol 602, comprising a stop symbol, can have associated signal characteristics 604, such that a detected pulse has a pulse width greater than eight times that of the pilot signal dynamic reference pulse width held low or greater than or equal to four times pilot_max held high.

In addition, an exemplary control symbol 602, comprising a digital zero, can be predefined to have associated signal characteristics 604, such that a detected pulse has a pulse width greater than or equal to one times that of the pilot signal dynamic reference pulse width held high and less than two times that of the pilot signal dynamic reference pulse width, where one times pilot signal dynamic reference pulse width held high provides a measure of robustness. Likewise, an exemplary control symbol 602, comprising a digital one, can be predefined to have associated signal characteristics 604, such that a detected pulse has a pulse width greater than or equal to two times that of the pilot signal dynamic reference pulse width held high and less than four times that of the pilot signal dynamic reference pulse width, where three times pilot signal dynamic reference pulse width held high provides a measure of robustness.

What has been described above, regarding control symbol 602 and associated signal characteristics 604, relates to the general case of selecting a pilot signal having a dynamic reference pulse width in non-limiting embodiments employing exemplary control interfaces and associated protocols for the general case. In non-limiting embodiments, for example, such as those described above regarding FIG. 2, MEMS sensors that can have typical frequency variance of OSC associated with an analog MEMS acoustic sensor 202 that can be relatively large (e.g., having an expected maximum/minimum ratio of about six to one), the selection of a pilot signal having a dynamic reference pulse width in exemplary control interfaces and associated protocols can accommodate the frequency variance of OSC associated with an analog MEMS acoustic sensor 202.

Furthermore, it is noted that, to promote robustness of exemplary control interfaces and associated protocols, exemplary non-implementations can employ a low signal of a multiple of one dynamic reference pulse width of a pilot signal between two adjacent pulses. In addition, in non-limiting embodiments, for example, such as those described above regarding FIG. 2 comprising analog MEMS acoustic sensor 202 and involving the selection of a pilot signal having a dynamic reference pulse width, to further promote robustness of exemplary control interfaces and associated protocols, a preliminary selection of relatively long dynamic reference pulse width of an associated pilot signal can be chosen to safely control exemplary analog MEMS acoustic sensor 202. However, further non-limiting implementations can route internal clock or OSC out of acoustic sensor 202, for example, to facilitate further reductions in dynamic reference pulse width of an associated pilot signal to increase data transmission rate.

However, for non-limiting embodiments, for example, such as those described above regarding FIGS. 3-5, regarding digital MEMS sensors that can be associated with an external clock that could be fully controlled, and thus, those embodiments having the ability to have a known relationship to the control pin, further non-limiting embodiments of the subject disclosure described herein can provide a synchronous data transmission protocol in connection with control interfaces and associated protocols in the context of digital MEMS acoustic sensors. Accordingly, FIG. 6 presents exemplary control symbols 606 and associated signal characteristics 608 in the particular context of digital MEMS sensors capable of synchronous data transmission protocols for exemplary control interfaces as described herein, regarding FIGS. 3-5. Thus, in these instances, a dynamic reference pulse width of a pilot signal can be chosen to equal one clock cycle, as an example.

Thus, an exemplary control symbol 606, comprising a start symbol, can have associated signal characteristics 606, such that a pilot signal can have a recommended dynamic reference pulse width of one clock cycle high. Likewise, an exemplary control symbol 606, comprising a stop symbol, can have associated signal characteristics 608, such that a detected pulse has a pulse width greater than eight times that of the pilot signal dynamic reference pulse width (e.g., or greater than eight times one clock cycle) held low or greater than or equal to four times pilot_max held high (e.g., or greater than or equal to 1,020 clock cycles).

In addition, an exemplary control symbol 606, comprising a digital zero, can be predefined to have associated signal characteristics 608, such that a detected pulse has a pulse width one clock cycle held high. Likewise, an exemplary control symbol 606, comprising a digital one, can be predefined to have associated signal characteristics 608, such that a detected pulse has a pulse width two cycles held high.

Figure 7:
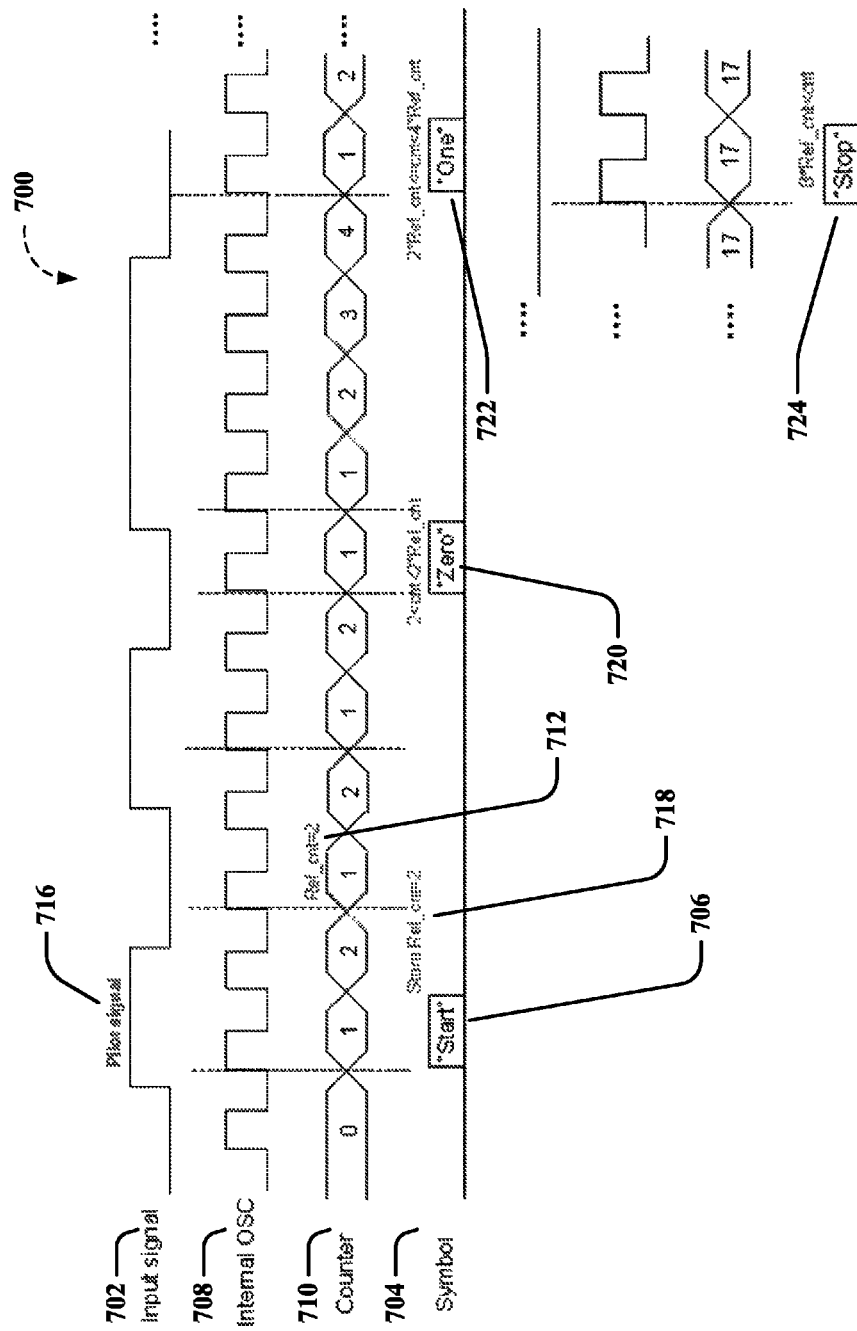
FIG. 7 depicts an exemplary digital timing diagram of a non-limiting pulse detection method according to various embodiments of the subject disclosure.

FIG. 7 depicts an exemplary digital timing diagram 700 of a non-limiting pulse detection method according to various embodiments of the subject disclosure. For instance, with the predefined symbols described above regarding FIG. 6, a pulse detection method can be employed to determine width of a detected pulse at a control pin associated with a MEMS sensor as described herein. According to non-limiting aspect, a first rising edge of an input signal 702 can be treated as a "Start" control signal 704 comprising the predefined control symbol, "start" 706. In a further non-limiting aspect, an exemplary control interface component, as described herein, in conjunction with the clock or internal OSC 708 signal, can sample the input signal 702 on the control pin and can facilitate a counter 710 counting (e.g., Ref_cnt 712) the high pulse width of the pulse of the input signal 702, which is to become the pilot signal 716 having a dynamic reference pulse width (e.g., Ref_cnt (712)=2).

According to still further aspects, an exemplary control interface component, as described herein, can facilitate storing 718 (e.g., Store Ref_cnt=2) the dynamic reference pulse width (e.g., Ref_cnt (712)=2), for example, as further described above regarding FIG. 1. For instance, an exemplary control interface component can store the dynamic reference pulse width (e.g., Ref_cnt (712)=2), for example, into a register for use as the dynamic reference pulse width of the pilot signal. Thereafter, if a width of a detected high is determined to be between one and two times the dynamic reference pulse width of the pilot signal (e.g., between one and two times Ref_cnt (712)=2, or between 2 and 4), the associated control symbol 704 in the control signal of input signal 702 is determined to be a control symbol, "zero" 720. Similarly, if a width of a detected high is determined to be between two and four times the dynamic reference pulse width of the pilot signal (e.g., between two and four times Ref_cnt (712)=2, or between 4 and 8), the associated control symbol 704 in the control signal of input signal 702 is determined to be a control symbol, "one" 722.

In a further non-limiting aspect, an exemplary control interface component, as described herein, can facilitate counter 710 counting after the falling edge of the input signal. For instance, if the input signal 702 is low longer than eight times the dynamic reference pulse width of the pilot signal (e.g., longer than eight times Ref_cnt (712)=2, or longer than 16) after the falling edge of the input signal 702, the associated control symbol 704 in the control signal of input signal 702 is determined to be a control symbol, "stop" 724. In another non-limiting aspect, an exemplary control interface component, as described herein, can, in addition to determining the control symbol 704, "stop" 724, in the control signal of input signal 702, facilitate one or more of resetting counter 710, clearing the stored dynamic reference pulse width (e.g., Store Ref_cnt=2), and/or return to a ready or awaiting status, such that determination of a new "start" control symbol 704, in the control signal of input signal 702 and the dynamic reference pulse width of the pilot signal can begin anew.

Figure 8:
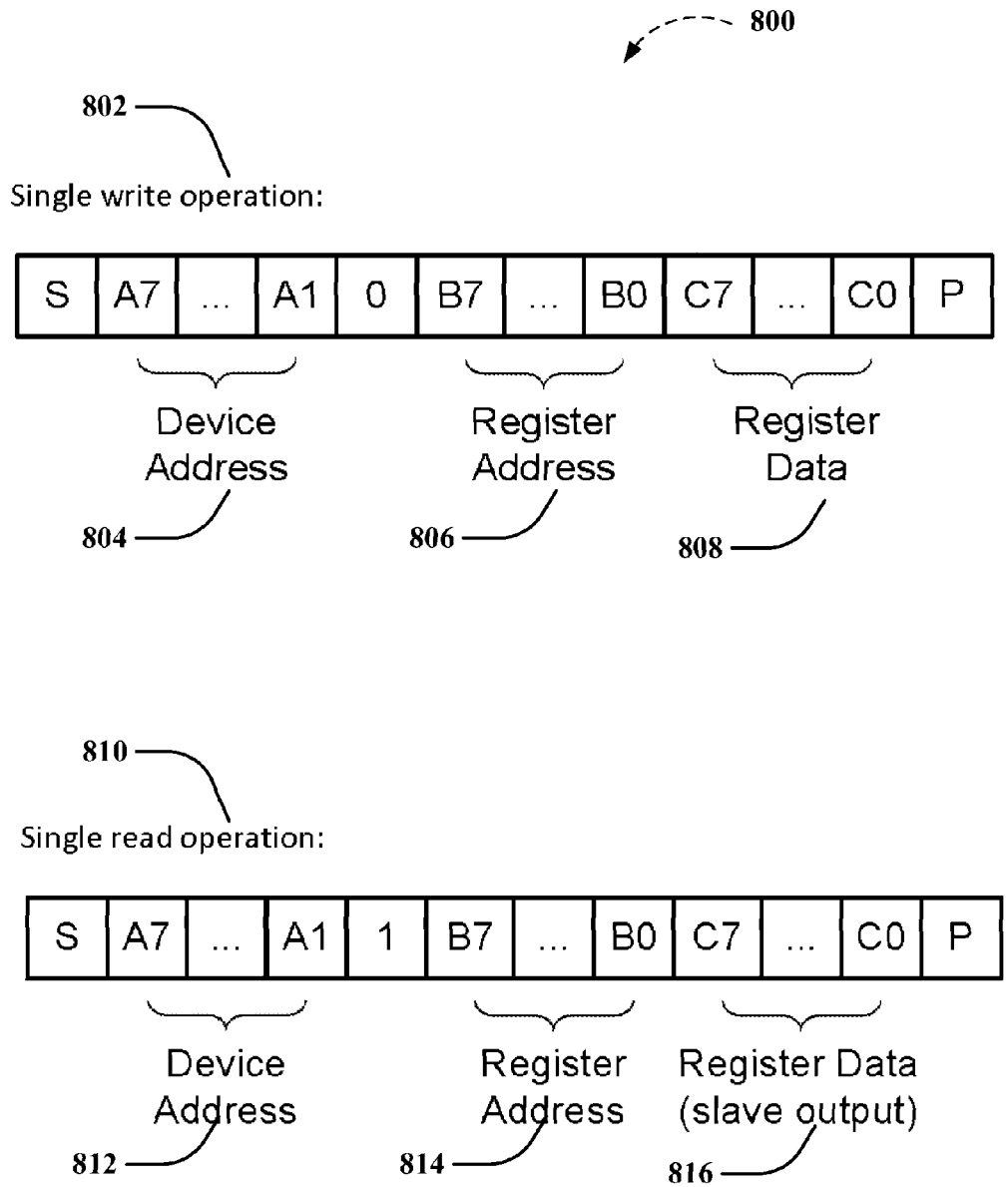
FIG. 8 depicts exemplary protocols for read and write operations, according to further embodiments of the subject disclosure.
Figure 9:
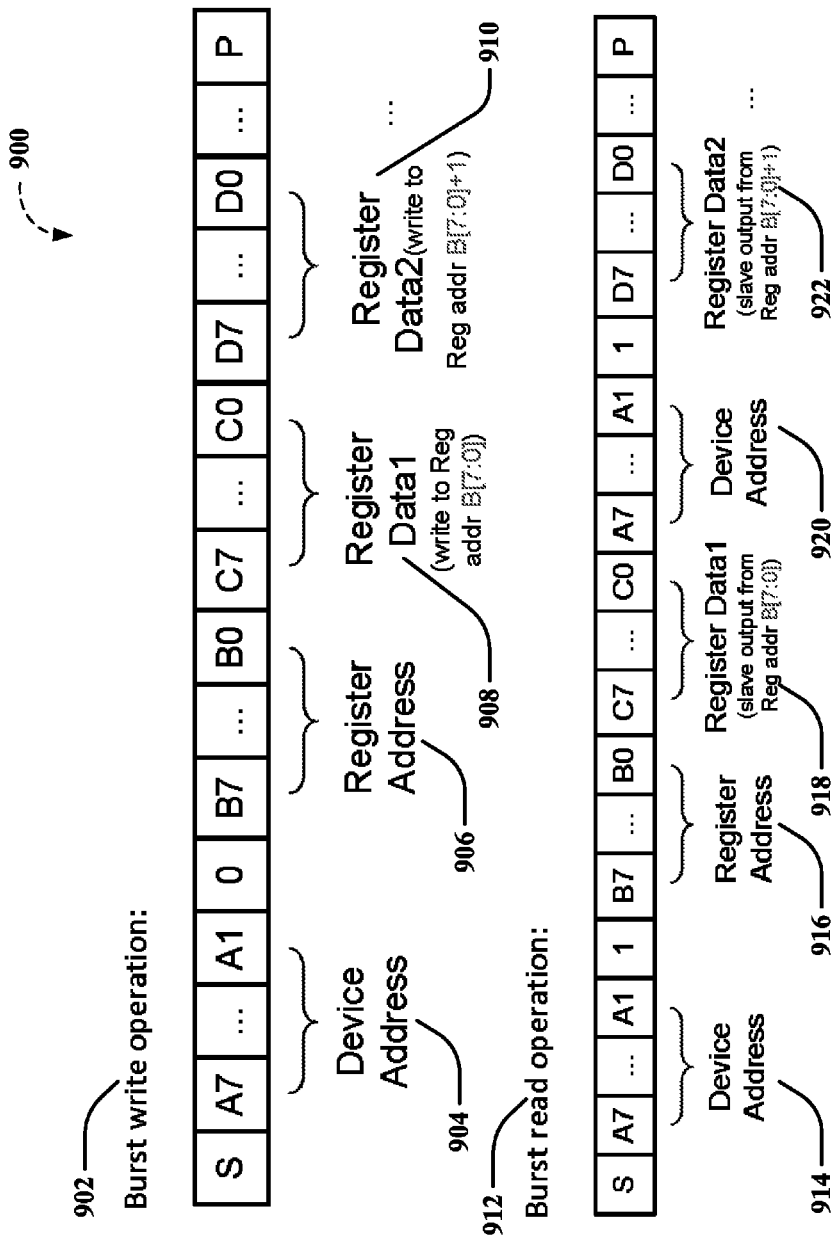
FIG. 9 depicts further non-limiting protocols for burst read and burst write operations that can be practiced by various non-limiting embodiments of the subject disclosure.

FIGS. 8-9 depict exemplary protocols for read and write operations, according to further embodiments of the subject disclosure. For instance, FIG. 8 depicts exemplary protocols 800 for read and write operations, according to further embodiments of the subject disclosure. FIG. 9 depicts further non-limiting protocols 900 for burst read and burst write operations that can be practiced by various non-limiting embodiments of the subject disclosure. For example, FIG. 8 depicts a single write operation 802 comprising a device address 804, register address 806, register data 808, without the implementation or necessity of a signal to acknowledge (ACK) the receipt of data, and where "S" and "P" indicate the "start" and "stop" bits, respectively. In a non-limiting aspect, the "start" bit and/or the "stop" bit can be generated by an exemplary external controller as defined by the predefined control symbols, for example, as further described herein. In a further non-limiting aspect, device address 804 can be set as a default (e.g., 7'h28), and/or could be could be changeable to accommodate any of a variety in number and/or type of MEMS sensors.

It is noted that a "stop" control symbol could occur at any place during the protocol. As a result, whenever a "stop" control symbol is detected or is determined, an exemplary MEMS sensor employing exemplary control interfaces and/or associated protocols as described herein could revert to a reset state to await a new "start" control symbol, as further described herein. In further non-limiting implementations, an exemplary MEMS sensor comprising an exemplary control interface component and employing exemplary control interfaces and/or associated protocols as described herein could further comprise watchdog and/or self reset functionality that could cause exemplary MEMS sensors to resume normal operation in response to any detected errors in control interfaces and/or associated protocol operations.

FIG. 8 depicts a single read operation 810 comprising a device address 812, register address 814, register data 816, without the implementation or necessity of an ACK signal to acknowledge the receipt of data, and where "S" and "P" indicate the "start" and "stop" bits, respectively. In a non-limiting aspect, the "start" bit and "stop" bit can be generated by an exemplary external controller as defined by the predefined control symbols, for example, as further described herein. In a further non-limiting aspect, device address 812 can be set as a default (e.g., 7'h28), and/or could be could be changeable to accommodate any of a variety in number and/or type of MEMS sensors.

FIG. 9 depicts further non-limiting protocols 900 for burst read and burst write operations that can be practiced by various non-limiting embodiments of the subject disclosure. Thus, FIG. 9 depicts a burst write operation 902 comprising a device address 904, register address 906, register data1 908, and register data2 910, as well as a burst read operation 912 comprising a device address 914, register address 916, register data1 918, device address 920 and register data2 922 without the implementation or necessity of an ACK signal to acknowledge the receipt of data, and where "S" and "P" indicate the "start" and "stop" bits, respectively. In a non-limiting aspect, the "start" bit and/or the "stop" bit can be generated by an exemplary external controller as defined by the predefined control symbols, for example, as further described herein. In a further non-limiting aspect, device address 812 can be set as a default (e.g., 7'h28), and/or could be could be changeable to accommodate any of a variety in number and/or type of MEMS sensors.

For readback of one or more internal registers associated with an exemplary MEMS sensor, as described herein, an exemplary external controller could be configured to wait for exemplary MEMS sensors to output valid symbols, for example, symbols generated by a control interface component comprising or associated with a clock associated with the MEMS sensor and counting an output counter. In a non-limiting aspect, an exemplary external controller can be configured to always wait for a predetermined number of times the dynamic reference pulse width of a pilot signal (e.g., three times the dynamic reference pulse width of a pilot signal, such as three times pilot cycles for exemplary analog MEMS acoustic sensor 202 as described regarding FIG. 2, etc.) or a predetermined number of clock cycles (e.g., three clock cycles for a digital MEMS acoustic sensor having dynamic reference pulse width of the pilot signal as "1" as described regarding FIGS. 3-5, etc.) for a bit readback. Accordingly, in a further non-limiting aspect, during this predetermined number of times pilot cycles wait interval, exemplary MEMS sensors could output a two pilot cycles low signal followed by one pilot cycle high signal to return a digital zero or a one times pilot cycle low signal followed by two times pilot cycles high signal to return a digital one. According to further non-limiting aspects of the subject disclosure, a fixed three times pilot cycle wait interval could facilitate ease of handling for an external receiver (e.g., such as an external controller described herein) by providing a fixed read-back time, during which, the expected value stored in the one or more internal registers associated with exemplary MEMS sensors would not be expected to vary. Accordingly, an exemplary external controller, as described herein, need only determine whether the sample in fixed position is high or low, as compared to other complicated detection methods (e.g., employing a pulse detector to determine a pulse width for determining whether the value is a digital one or digital zero, etc.).

Figure 10:
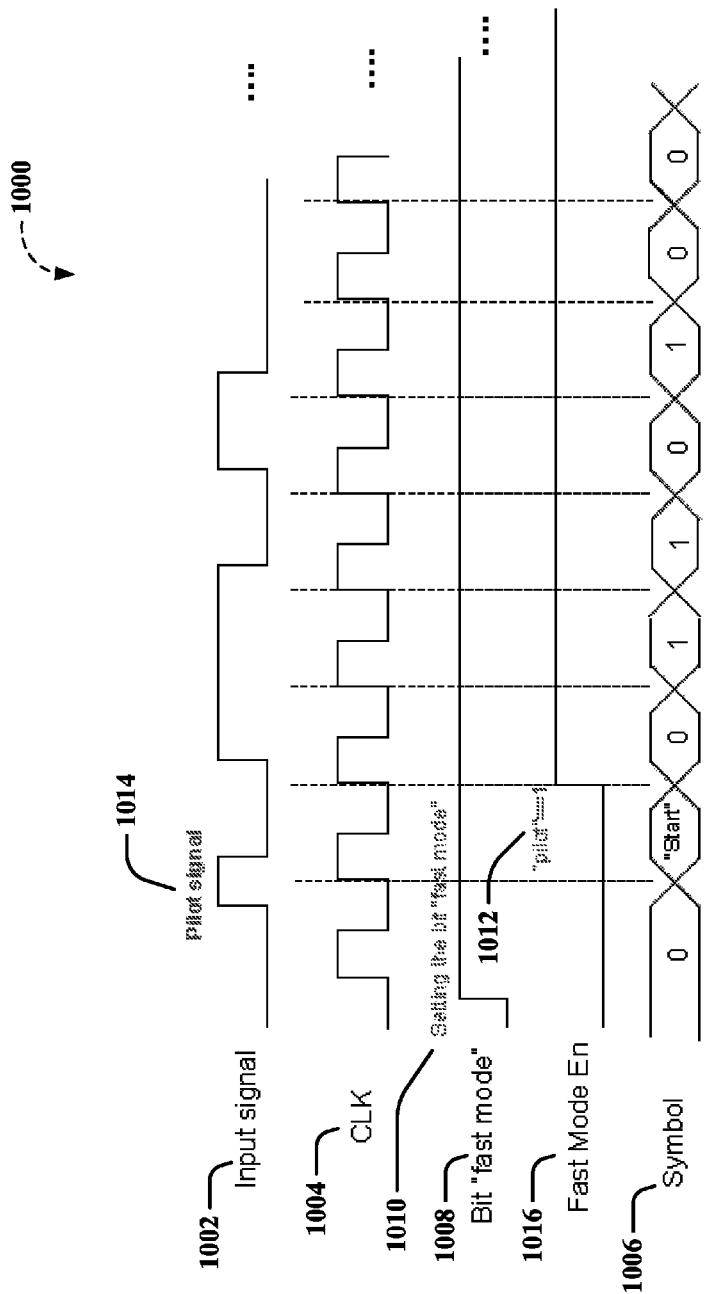
FIG. 10 depicts another digital timing diagram of a non-limiting fast data sampling mode according to further embodiments of the subject disclosure.

FIG. 10 depicts another digital timing diagram 1000 of a non-limiting fast data sampling mode according to further embodiments of the subject disclosure. In addition to normal operation read and write protocols described above regarding FIGS. 8 to 9, exemplary control interfaces, control interface components, and associated protocols can provide an exemplary fast data sampling mode, which can provide data sampling each clock (e.g., one sample per clock), in addition to employing a pulse-detection method as described herein to detect values on an exemplary control pin. For example, an exemplary fast data sampling mode facilitating data sampling each clock (e.g., one sample per clock) could increase the bus efficiency (e.g., by forgoing signaling overhead in generating, detecting, and/or determining control symbols in associated control signals) for a synchronous system (e.g., one in which an exemplary MEMS sensor comprising an exemplary control interface component and an exemplary external controller use the same clock as that employed to generate a control signal). In a non-limiting aspect, the exemplary fast data sampling mode can be employed to facilitate an in-system scan of digital MEMS acoustic sensors to facilitate rapid register writes for large amounts of data to be written.

Figure 11:
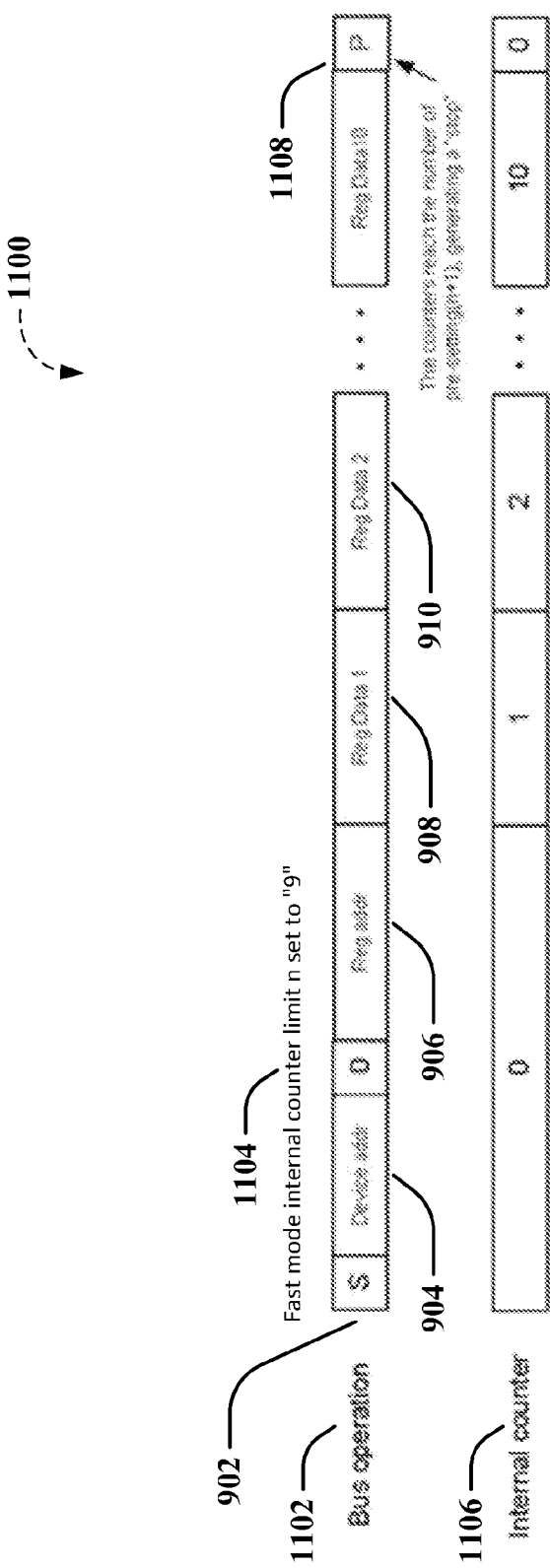
FIG. 11 depicts a further non-limiting protocol for non-limiting fast data sampling mode operations that can be practiced by various non-limiting embodiments of the subject disclosure.

Thus, in the context of an exemplary fast data sampling mode as described above, FIG. 10 depicts an exemplary input signal 1002, external clock (CLK) signal 1004, counter 1006 and associated symbols or values, as well as values 1008 associated with setting a fast data sampling mode bit 1010. FIG. 11 depicts a further non-limiting protocol 1100 for non-limiting fast data sampling mode operations that can be practiced by various non-limiting embodiments of the subject disclosure. For instance, an exemplary fast data sampling mode 1102, as described herein, can support an exemplary burst write operation 902, as described above regarding FIG. 9. In this mode, the data line on the control pin can be sampled by an exemplary control interface component every clock rising edge and can be transmitted as the value without signaling overhead in generating, detecting, and/or determining control symbols in associated control signals. In a non-limiting aspect, exemplary fast data sampling mode can be enabled by first writing 1010 a "fast mode" bit 1008, for example, by using a single write operation 802 as described above regarding FIG. 8. In addition, the dynamic reference pulse width, or "pilot" 1012, of pilot signal 1014 for exemplary fast data sampling mode 1102 can be one cycle. Note that, according to a non-limiting aspect, if the pilot 1012 is set a value larger than one cycle, the bus operation can remain in the mode employing the exemplary pulse-detection method described herein to sample the data line.

Note further that, in the exemplary fast data sampling mode, a value could be sampled in each clock cycle. Thus, to facilitate ending an exemplary fast data sampling mode, an exemplary control interface component can be configured to set an internal counter, the expiration of which can facilitate ending exemplary fast data sampling mode operations. Accordingly, in a non-limiting aspect, before entry into an exemplary fast data sampling mode, an external controller can be configured to first set a register (e.g., by using a single write operation 802 as described above regarding FIG. 8, etc.) for a burst operation number or exemplary fast data sampling mode internal counter limit 1104. As a result, internal counter 1106 can be incremented by one with each burst operation or clock cycle. In a further non-limiting aspect of an exemplary fast data sampling mode, when the internal counter 1106 reaches the internal counter limit 1104 plus one, the bus can automatically exit 1108 from the burst write operation. In another non-limiting aspect of an exemplary fast data sampling mode, a single write in could be realized employing the exemplary fast data sampling mode, for example, by setting the burst operation number or exemplary fast data sampling mode internal counter limit 1104 to zero.

Accordingly, exemplary devices comprising one or more MEMS sensors employing exemplary control interface components as described herein can receive data and instructions from other devices based on exemplary control interfaces and associated protocols described above, to facilitate one or more of identification, testing, programming, observation, configuration, control, and/or compensating so on of one or more MEMS sensors included in a package, or otherwise, for example, as further described herein. The above functions include but are not limited to enabling or disabling features such as digital output, calibration, and determining a degree of compensation of a MEMS sensor, including, but not limited to, phase matching and gain trimming, etc.

As a non-limiting example, the subject disclosure provides a non-limiting embodiment of device, comprising a package including a MEMS transducer (e.g., a package comprising an exemplary MEMS acoustic sensor 102/202/302/402/502 comprising exemplary MEMS transducer 104/204/304/404/504, etc.) associated with a clock signal (e.g., one of an internal OSC or an external clock signal, such as, for example, CLK and/or SCK, etc.). Non-limiting embodiments of a device can further comprise one or more registers associated with the MEMS transducer, a pin (e.g., existing pin 112/212/312/412/512 or CONFIG pin of an I$^2$S digital MEMS acoustic sensor) of the package configured to transmit or receive a signal (e.g. OUTPUT, L/R select, CONFIG, etc.), wherein the pin is further configured (e.g., as a control pin) to transmit or receive a control signal, and wherein the control signal is configured to control the MEMS transducer based on a determination of a control symbol included in the signal, for example, as further described above regarding FIG. 6.

As a non-limiting example, a determination of the control symbol (e.g., by exemplary control interface component 106/206/306/406/506, etc.) can be based on detection of a pulse width of a pulse associated with the signal and the clock signal, wherein the pulse can be based on the signal being at a high value or low value for a dynamic number of cycles of the clock signal (e.g., based on a dynamic reference pulse width), for example, as further described above regarding FIGS. 6-7. Thus, non-limiting embodiments of a device can detect the pulse by detecting a signal being held at a predetermined value for the dynamic number of cycles of the clock signal (e.g., based on a dynamic reference pulse width) compared to a pilot signal having the dynamic reference pulse width, wherein the pulse width is defined as a multiple of the pilot signal, and wherein the predetermined value comprises at least one of a digital high signal or a digital low signal. In a further non-limiting example, the dynamic reference pulse width can comprise a selected number of clock cycles associated with the clock signal that the signal is held at the predetermined value.

For example, exemplary control symbols 602 and associated signal characteristics 604 for exemplary control interfaces as described herein, regarding FIGS. 1-5, are described for the general case, for example, whereas exemplary control symbols 606 and associated signal characteristics 608 are presented above in the particular context of digital MEMS sensors capable of synchronous data transmission protocols for exemplary control interfaces as described herein, regarding FIGS. 3-5. Thus, exemplary control symbols can comprise one or more of a start symbol, a stop symbol, a digital zero, or a digital one. In addition, FIG. 7 depicts an exemplary digital timing diagram 700 of a non-limiting pulse detection method.

In addition, exemplary embodiments of devices as described herein can employ a control signal configured to read or write data from or to the one or more registers associated with the MEMS transducer. As a non-limiting example, FIGS. 8-11 provide and/or describe exemplary control interfaces and/or associated protocols that facilitate read and write of one or more registers associated with an exemplary MEMS transducer (e.g., exemplary MEMS transducer 104/204/304/404/504 associated with exemplary MEMS acoustic sensor 102/202/302/402/502, etc.). In a further non-limiting aspect, exemplary embodiments of devices as described herein can further employ an exemplary fast data sampling mode, such that the control signal is further configured to allow data associated with the MEMS transducer to be sampled in each clock cycle associated with the clock signal, for example, as further described above regarding FIGS. 10-11.

Figure 12:
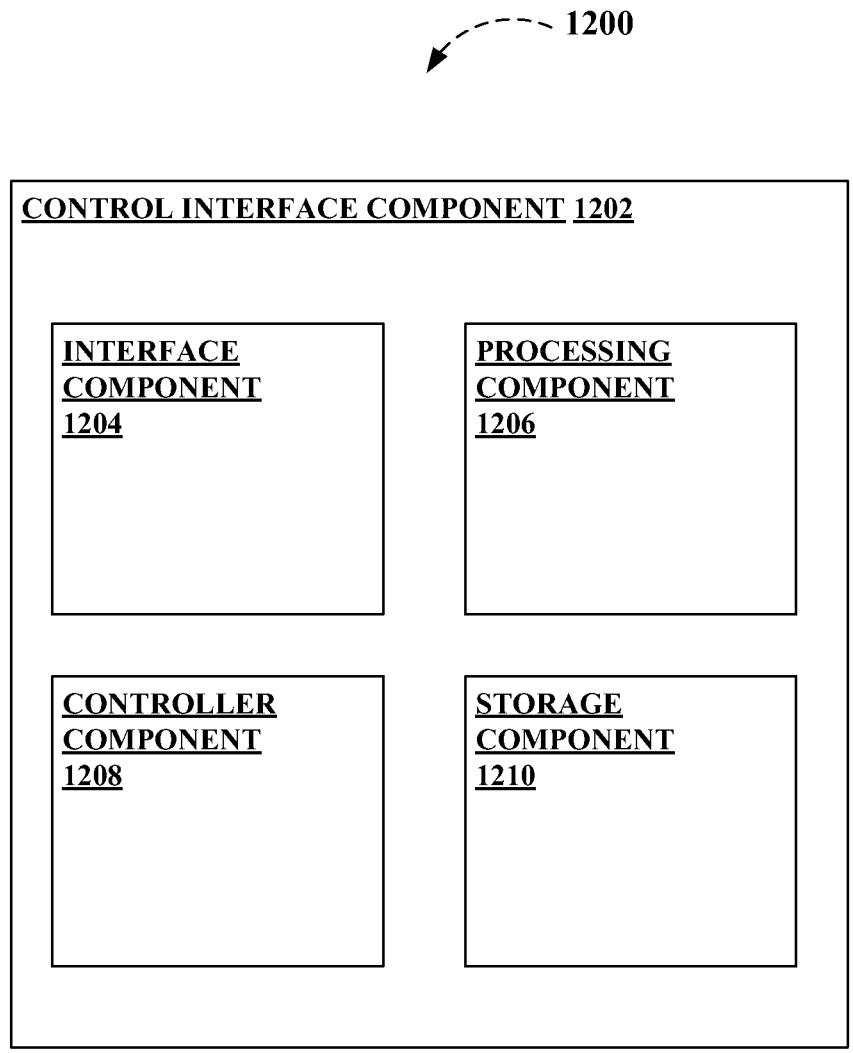
FIG. 12 illustrates a functional block diagram of an exemplary control interface component.

FIG. 12 illustrates a functional block diagram 1200 of an exemplary control interface component, as further described herein. For instance, an exemplary control interface component 1202 can comprise any of the control interface components 106/206/306/406/506, etc., and/or portions thereof, as further described above. As further described herein, exemplary control interface component 1202 can comprise one or more of an interface component 1204 configured to receive a control signal associated with an exemplary MEMS sensor (e.g., exemplary MEMS acoustic sensor 102/202/302/402/502, etc.), a processing component 1206 configured to determine whether a control symbol (e.g., control symbol 602, control symbol 606, etc.) is present in the control signal based on a width of a pulse associated with the control signal and a clock signal associated with an exemplary MEMS sensor (e.g., exemplary MEMS acoustic sensor 102/202/302/402/502, etc.), and/or a controller component 1208 configured to control operations related to exemplary MEMS sensor (e.g., exemplary MEMS acoustic sensor 102/202/302/402/502, etc.) based on the control symbol, for example, as further described herein.

For example, an exemplary interface component 1204 can comprise components and/or circuitry for data and/or clock conditioning, which can facilitate, for example, conditioning signals for digital data signaling. As a further non-limiting example, an exemplary processing component 1206 can comprise processing functionality provided by one or more of an MCU, a DSP, an FPGA, and/or an ASIC, and/or portions or combinations thereof. In further non-limiting examples, an exemplary controller component 1208 can be coupled between one or more of an exemplary interface component 1204 and/or an exemplary processing component 1206 and the one or more registers coupled to an exemplary MEMS transducer (e.g., exemplary MEMS transducer 104/204/304/404/504 associated with exemplary MEMS acoustic sensor 102/202/302/402/502, etc.). Accordingly, controller component 1206 can be further configured to read or write data from or to one or more registers associated with the exemplary MEMS acoustic sensor 102/202/302/402/502, etc.), for example, based on the control symbol in the control signal, as described herein. In addition, processing component 1206 can be further configured to determine whether one or more of a start symbol, a stop symbol, a digital zero, or a digital one is included in the control signal, and can be configured to determine a dynamic reference pulse width associated with a pilot signal being high or low for a predetermined number of cycles of the clock signal by counting a number of clock cycles associated with the clock signal, for which the control signal is held at the digital high signal or the digital low signal, as further described herein.

In addition, exemplary control interface component 1202 can further comprise or be associated with a storage component 1208 (e.g., comprising a memory such as a nonvolatile memory, one or more registers, etc.) configured to, for example, store a dynamic reference pulse width (e.g., associated with a pilot signal, etc.) to facilitate a determination of whether the control symbol (e.g., control symbol 602, control symbol 606, etc.) is included in the control signal, for example, where the dynamic reference pulse width can be employed in MEMS sensor control interfaces and associated protocols based on pulse-width detection, as further described herein. In addition, storage component 1208 can be further configured to facilitate employing a fast data sampling mode, for example, by facilitating setting or writing 1010 a "fast mode" bit 1008, setting or writing a burst operation number or exemplary fast data sampling mode internal counter limit 1104, and so on. By way of illustration, and not limitation, storage component 1208 can comprise or be associated with a nonvolatile memory that can include read only memory (ROM), programmable ROM (PROM), electrically programmable ROM (EPROM), electrically erasable programmable ROM (EEPROM), or flash memory, and can include or be associated with one or more registers as described herein. Storage component 1208 can additionally or alternatively comprise or be associated with a volatile memory that can include random access memory (RAM), etc. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

As further described herein, one or more of exemplary interface component 1202, processing component 1204, control component 1206, and/or storage component 1208, and/or portions or combinations thereof can be included in a package comprising an exemplary MEMS sensor (e.g., exemplary MEMS acoustic sensor 102/202/302/402/502, etc.), and can include or be integrated, in whole or in part, with an ASIC and/or components and/or circuitry associated with the exemplary MEMS sensor (e.g., exemplary MEMS acoustic sensor 102/202/302/402/502, etc.), and/or portions thereof.

Figure 13:
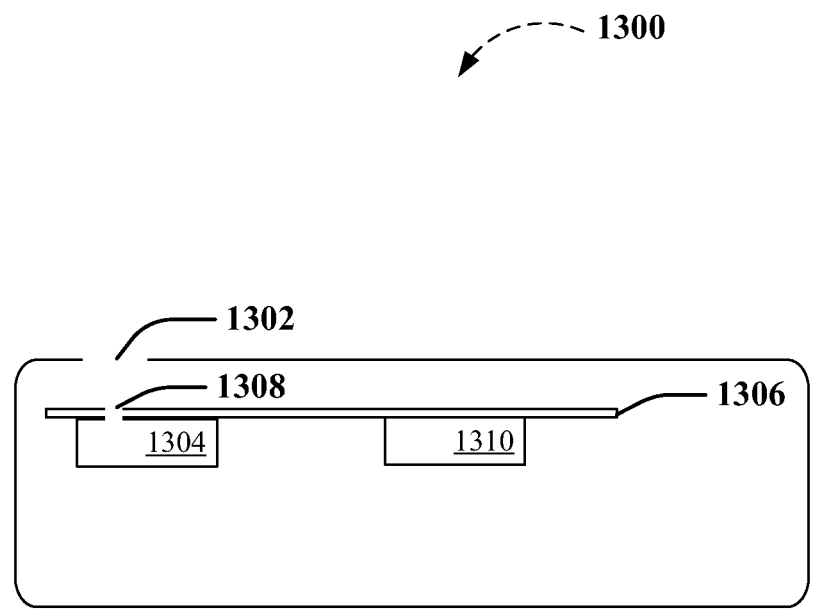
FIG. 13 illustrates a functional block diagram of non-limiting host system that can comprise or be associated with an exemplary MEMS sensor and control interface component, according to various non-limiting aspects of the subject disclosure.

FIG. 13 illustrates a functional block diagram of non-limiting host system 1300 that can comprise or be associated with an exemplary MEMS sensor (e.g., exemplary MEMS acoustic sensor 102/202/302/402/502, etc.) and exemplary control interface component (e.g., any of control interface components 106/206/306/406/506, and/or portions thereof, etc.) according to various non-limiting aspects of the subject disclosure. More specifically, a block diagram of a host system 1300 is shown to include an acoustic port 1302 and an exemplary MEMS sensor 1304 (e.g., comprising one or more of exemplary MEMS acoustic sensor 102/202/302/402/502, other sensors, etc.) affixed to a PCB 1306 having an orifice 1308 or other means of passing acoustic waves or pressure to exemplary MEMS sensor 1304.

In addition, exemplary MEMS sensor 1304 (e.g., comprising one or more of exemplary MEMS acoustic sensor 102/202/302/402/502, other sensors, etc.) can comprise or be associated with an exemplary control interface component (e.g., any of control interface components 106/206/306/406/506, and/or portions thereof, etc.). Host system 1300 can further comprise a device 1310, such as a host system 1300 processor, an external device associated with exemplary MEMS sensor 1304, and/or an application processor, that can be mechanically affixed to PCB 1306 and can be communicably coupled to exemplary MEMS sensor 1304, to facilitate generating and/or transmitting control signals comprising exemplary control symbols (e.g., control symbol 602, control symbol 606, etc.), reading and/or writing data or from one or more registers associated with MEMS sensor 1304, such as, for example, as described herein, regarding external controller 108/208/308/408/508, etc., and/or receiving and/or transmitting other signals, information, and/or data, from or to MEMS sensor 1304.

Examples of the MEMS sensor 1304 can comprise gyroscopes, accelerometers, magnetometers, pressure sensors, acoustic sensors or microphones, and radio-frequency components, and so on, as described herein regarding FIGS. 1-5, for example. Exemplary host system 1300 can be any of a number of exemplary host systems that can comprise a system processor and/or external device comprising or associated with MEMS sensor 1304, and/or an application processor of a device comprising or associated with MEMS sensor 1304 such as a feature phone, smartphone, smart watch, tablet, eReader, netbook, automotive navigation device, gaming console or device, wearable computing device, GPS device, test, characterization, and/or sort platform, and so on, without limitation.

Figure 14:
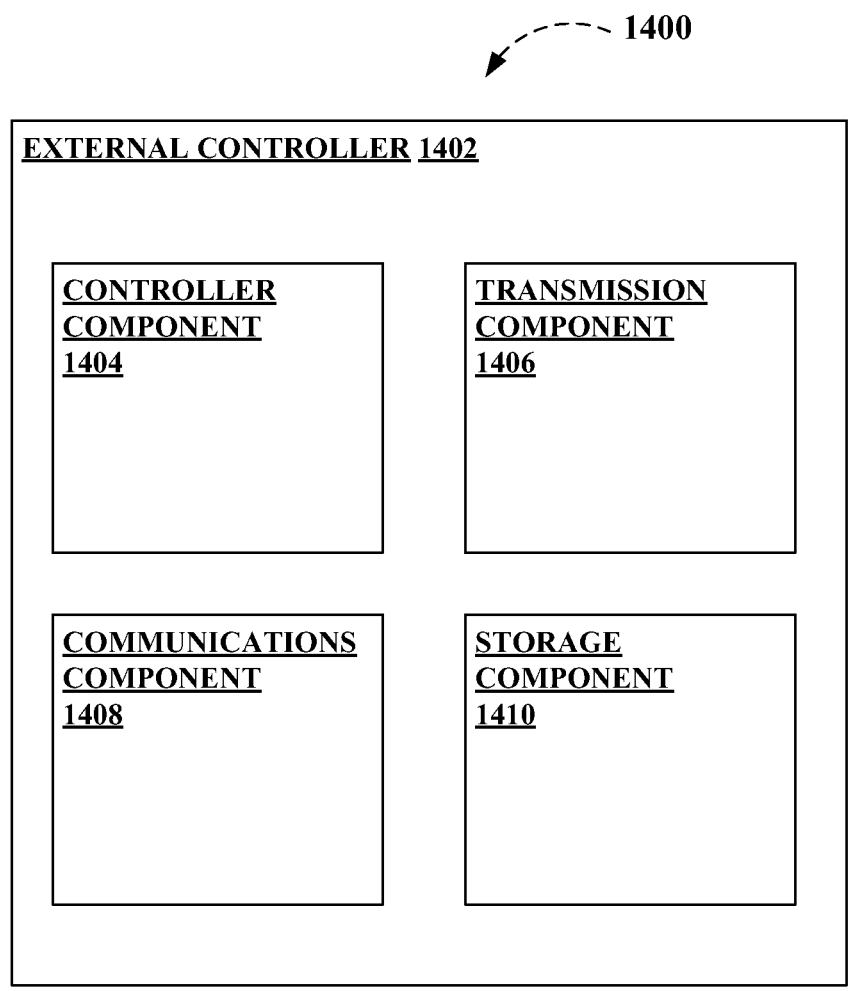
FIG. 14 illustrates a functional block diagram of an exemplary external controller, according to various embodiments.

FIG. 14 illustrates a functional block diagram 1400 of an exemplary external controller 1402, according to various embodiments. Accordingly, exemplary external controller 1402 can comprise any of external controller 108/208/308/408/508, etc., and/or portions thereof, as further described herein, regarding FIGS. 1-5. Thus, various embodiments of exemplary external controller 1402 can comprise a memory (not shown) to store computer-executable components and a processor (not shown) communicatively coupled to the memory that facilitates execution of computer-executable components. In an aspect, a processor (not shown) that facilitates execution of computer-executable components can comprise or be associated with a device 1310 or portions thereof, such as with respect to host system 1300 processor, an external device associated with exemplary MEMS sensor 1304, and/or an application processor, as further described above, regarding FIG. 13.

In a further aspect, an exemplary external controller 1402 comprising a processor (not shown) communicatively coupled to the memory that facilitates execution of computer-executable components can be a stand-alone system that employs exemplary control interfaces and associated protocols intended for temporary coupling with an exemplary MEMS sensor (e.g., comprising one or more of exemplary MEMS acoustic sensor 102/202/302/402/502, other sensors, etc.), for example, such as a platform for test, characterization, and/or sort of exemplary MEMS sensors. Embodiments of exemplary external controller 1402 comprising a memory (not shown) to store computer-executable components and a processor (not shown) communicatively coupled to the memory that facilitates execution of computer-executable components can comprise one or more of a controller component 1404, a transmission component 1406, and a communications component 1408. In further non-limiting implementations, external controller 1402 can also comprise a storage component 1410.

Accordingly, exemplary external controller 1402 comprising a controller component 1404 can be configured to generate one or more control symbols (e.g., one or more of control symbols 602, control symbols 606, etc.) in a control signal associated with an exemplary MEMS sensor (e.g., comprising one or more of exemplary MEMS acoustic sensor 102/202/302/402/502, other sensors, etc.) based on a pulse that has a pulse width associated with a clock signal (e.g., one of an internal OSC or an external clock signal, such as, for example, CLK and/or SCK, etc.) related to the exemplary MEMS sensor (e.g., comprising one or more of exemplary MEMS acoustic sensor 102/202/302/402/502, other sensors, etc.). Exemplary external controller 1402 comprising a controller component 1404 can be further configured to generate a pulse comprising a digital high signal or a digital low signal over a multiple of a pilot signal (e.g., pilot signal 716, pilot signal 1014, etc.), wherein the pilot signal can have a dynamic reference pulse width based on a predetermined number of cycles of the clock signal (e.g., one of an internal OSC or an external clock signal, such as, for example, CLK and/or SCK, etc.) related to the exemplary MEMS sensor (e.g., comprising one or more of exemplary MEMS acoustic sensor 102/202/302/402/502, other sensors, etc.). In addition, exemplary external controller 1402 comprising a controller component 1404 can be further configured to count a number of clock cycles associated with the clock signal (e.g., one of an internal OSC or an external clock signal, such as, for example, CLK and/or SCK, as described herein, etc.) and to hold the control signal at the digital high signal or the digital low signal for the number of clock cycles associated with a multiple of the pilot signal.

Exemplary external controller 1402 comprising a transmission component 1404 can be configured to transmit the control signal to the exemplary MEMS sensor (e.g., comprising one or more of exemplary MEMS acoustic sensor 102/202/302/402/502, other sensors, etc.), for example, wherein a pin (e.g., existing pin 112/212/312/412/512 or CONFIG pin of an I²S digital MEMS acoustic sensor) of the exemplary MEMS sensor can be configured to transmit or receive a signal (e.g. OUTPUT, L/R select, CONFIG, etc.) in addition to signals associated with the control signal. Exemplary external controller 1402 comprising a communications component 1408 can be configured to receive or transmit data from or to one or more registers associated with the exemplary MEMS sensor (e.g., comprising one or more of exemplary MEMS acoustic sensor 102/202/302/402/502, other sensors, etc.) based on the one or more control symbols (e.g., one or more of control symbols 602, control symbols 606, etc.). Thus, exemplary control symbols can comprise one or more of a start symbol, a stop symbol, a digital zero, or a digital one, for example, as described above regarding FIGS. 6-7. In addition, exemplary external controller 1402 comprising storage component 1410 can be configured to store the dynamic reference pulse width to facilitate generation of the pulse, for example, as further described herein. By way of illustration, and not limitation, storage component 1410 can comprise or be associated with the memory (not shown) to store computer-executable components and/or can comprise or be associated with a non-volatile memory that can include read only memory (ROM), programmable ROM (PROM), electrically programmable ROM (EPROM), electrically erasable programmable ROM (EEPROM), or flash memory, and can include or be associated with one or more registers as described herein. Storage component 1410 can additionally or alternatively comprise or be associated with a volatile memory that can include random access memory (RAM), etc. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

While various embodiments of exemplary MEMS sensors (e.g., comprising one or more of exemplary MEMS acoustic sensor 102/202/302/402/502, other sensors, etc.) according to aspects of the subject disclosure have been described herein for purposes of illustration, and not limitation, it can be appreciated that the subject disclosure is not so limited. Various implementations can be applied to other areas of MEMS sensor design, packaging, control, and/or interfacing, without departing from the subject matter described herein. For instance, it can be appreciated that other applications requiring exemplary MEMS sensors (e.g., comprising one or more of exemplary MEMS acoustic sensor 102/202/302/402/502, other sensors, etc.), exemplary control interfaces, exemplary control interface components, and/or associated protocols as described can include sensing devices other than MEMS acoustic sensors, whether or not such sensing devices involve applications employing an acoustic sensor or microphone. As a result, other embodiments or applications of MEMS sensors can include, but are not limited to, applications involving sensors associated with measuring temperature, pressure, humidity, light, and/or other electromagnetic radiation (e.g., such as communication signals, etc.), and/or other sensors associated with measuring other physical, chemical, or electrical phenomena for example, as further described herein, or otherwise.

In view of the subject matter described supra, methods that can be implemented in accordance with the subject disclosure will be better appreciated with reference to the flowcharts of FIGS. 15-17 and 19. While for purposes of simplicity of explanation, the methods are shown and described as a series of blocks, it is to be understood and appreciated that such illustrations or corresponding descriptions are not limited by the order of the blocks, as some blocks may occur in different orders and/or concurrently with other blocks from what is depicted and described herein. Any non-sequential, or branched, flow illustrated via a flowchart should be understood to indicate that various other branches, flow paths, and orders of the blocks, can be implemented which achieve the same or a similar result. Moreover, not all illustrated blocks may be required to implement the methods described hereinafter.

Exemplary Methods

Figure 15:
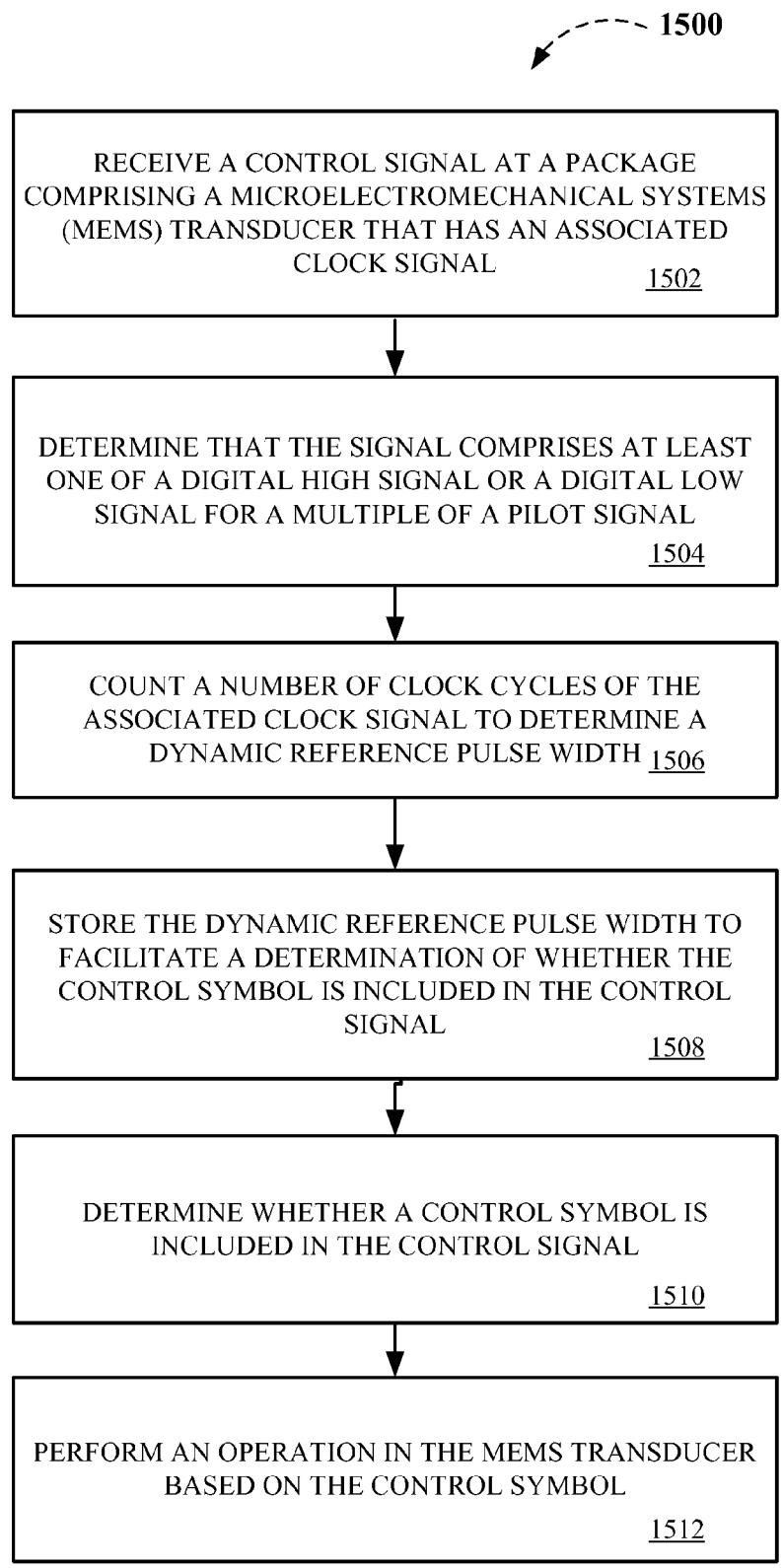
FIG. 15 provides a non-limiting flow diagram of exemplary methods according to various non-limiting aspects as described herein.

FIG. 15 provides a non-limiting flow diagram of exemplary methods 1500 according to various non-limiting aspects as described herein. For instance, at 1502, exemplary methods 1500 can comprise receiving a control signal at a package comprising a MEMS transducer (e.g., a package comprising an exemplary MEMS acoustic sensor 102/202/302/402/502 comprising exemplary MEMS transducer 104/204/304/404/504, etc.) that has an associated clock signal (e.g., one of an internal OSC or an external clock signal, such as, for example, CLK and/or SCK, etc.), wherein the control signal is received at a pin (e.g., existing pin 112/212/312/412/512 or CONFIG pin of an I²S digital MEMS acoustic sensor) of the package configured to transmit or receive a signal (e.g., OUTPUT, L/R select, CONFIG, etc.) in addition to receiving the control signal.

At 1504, exemplary methods 1500 can further comprise determining (e.g., via exemplary control interface component 106/206/306/406/506, portions thereof, etc.) that the signal comprises a digital high signal or a digital low signal for a multiple of a pilot signal (e.g., pilot signal 716, pilot signal 1014, etc.), wherein the pilot signal has a dynamic reference pulse width based on a predetermined number of cycles of the associated clock signal (e.g., one of an internal OSC or an external clock signal, such as, for example, CLK and/or SCK, etc.). In addition, exemplary methods 1500 can further comprise determining, at 1506, the dynamic reference pulse width (e.g., via exemplary control interface component 106/206/306/406/506, portions thereof, etc.) by counting a number of clock cycles of the associated clock signal, for which the signal is held at the digital high signal or the digital low signal. In addition, exemplary methods 1500 can further comprise storing the dynamic reference pulse width, at 1508, to facilitate the determining whether the control symbol (e.g., control symbol 602, control symbol 606, etc.) is included in the signal, as described herein, for example, regarding FIGS. 1-14, etc.

At 1510, exemplary methods 1500 can further comprise determining (e.g., via exemplary control interface component 106/206/306/406/506, portions thereof, etc.) whether a control symbol (e.g., control symbol 602, control symbol 606, etc.) is included in the signal. For instance, exemplary methods 1500 can comprise determining whether a start symbol, a stop symbol, a digital zero, or a digital one is included in the signal. Accordingly, exemplary methods 1500 can comprise determining a pulse width of a pulse associated with the signal and the associated clock signal (e.g., based on a dynamic reference pulse width), for example, as further described above regarding FIGS. 6-7.

Moreover, exemplary methods 1500 can comprise, at 1512, performing at least one operation in the MEMS transducer based on the control symbol. For instance, exemplary methods 1500 can comprise reading or writing data from or to one or more registers associated with the MEMS transducer (e.g., exemplary MEMS transducer 104/204/304/404/504, etc.). Moreover, exemplary methods 1500 can comprise enabling sampling of data associated with the MEMS transducer in each clock cycle of the associated clock signal, for example, according to a fast data sampling mode, as further described herein, regarding FIGS. 10-11.

Figure 16:
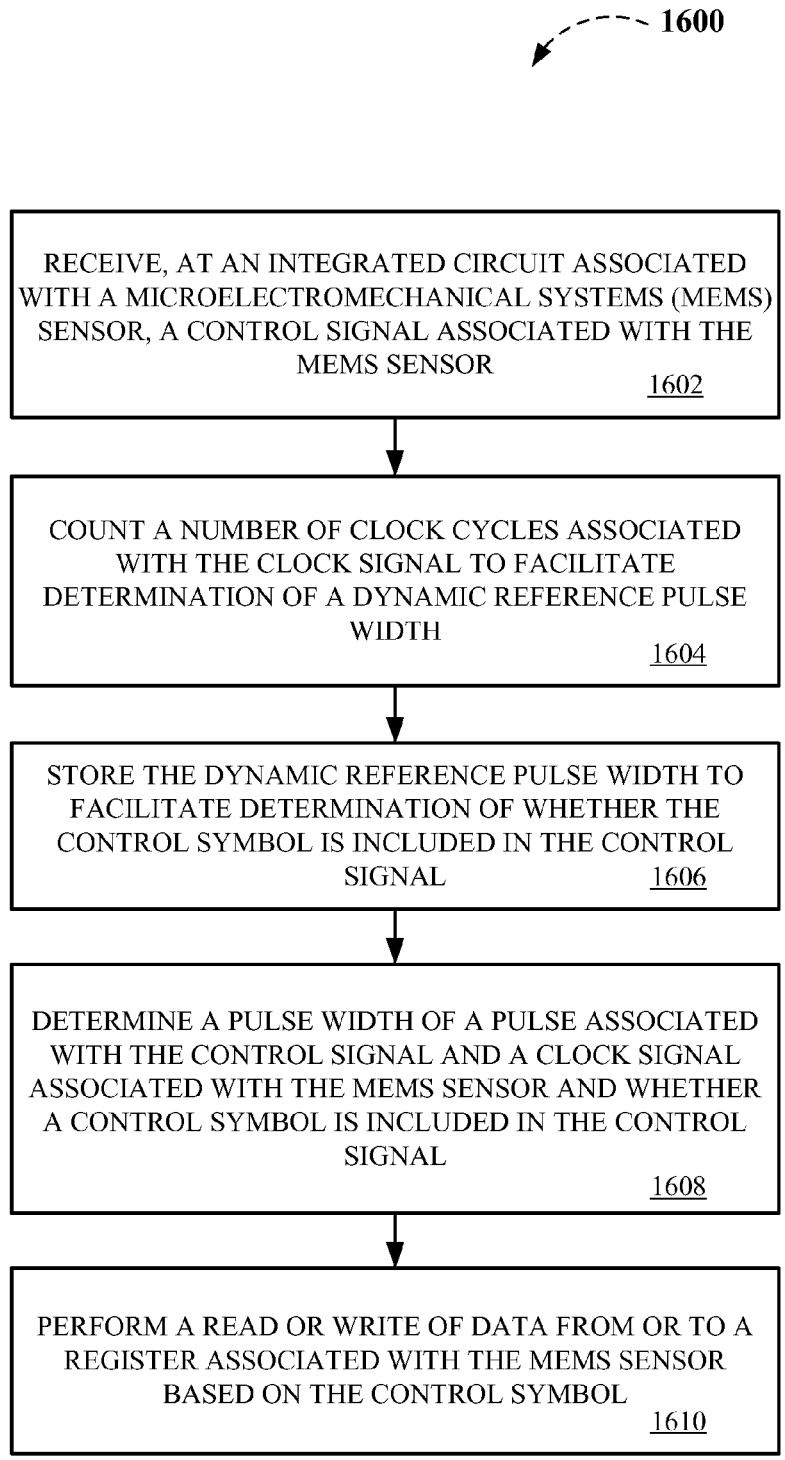
FIG. 16 provides another flow diagram of exemplary methods associated with an integrated circuit according to further non-limiting embodiments.

FIG. 16 provides another flow diagram of exemplary methods 1600 associated with an integrated circuit (e.g., exemplary control interface component 106/206/306/406/506, components or portions thereof, etc.) according to further non-limiting embodiments. For instance, at 1602, exemplary methods 1600 can comprise receiving, at an integrated circuit (e.g., exemplary control interface component 106/206/306/406/506, components or portions thereof, etc.) associated with a MEMS sensor (e.g., comprising one or more of exemplary MEMS acoustic sensor 102/202/302/402/502, other sensors, etc.), a control signal associated with the MEMS sensor, wherein a pin (e.g., existing pin 112/212/312/412/512 or CONFIG pin of an I²S digital MEMS acoustic sensor) of the MEMS sensor is configured to transmit or receive a signal (e.g., OUTPUT, L/R select, CONFIG, etc.) in addition to signals associated with the control signal.

In addition, exemplary methods 1600 can further comprise determining (e.g., via exemplary control interface component 106/206/306/406/506, components or portions thereof, etc.) the dynamic reference pulse width by counting a number of clock cycles associated with the clock signal (e.g., one of an internal OSC or an external clock signal, such as, for example, CLK and/or SCK, etc.), for which the control signal is held at the digital high signal or the digital low signal, at 1604. Exemplary methods 1600 can further comprise, at 1606, storing (e.g., via exemplary control interface component 106/206/306/406/506, components or portions thereof, etc.), in a memory associated with the integrated circuit, the dynamic reference pulse width to facilitate the determining whether the control symbol is included in the control signal, as described herein, for example, regarding FIGS. 1-14, etc.

At 1608, exemplary methods 1600 can further comprise determining (e.g., via exemplary control interface component 106/206/306/406/506, components or portions thereof, etc.) whether a control symbol (e.g., control symbol 602, control symbol 606, etc.) is included in the control signal based on determining a pulse width of a pulse associated with the control signal and a clock signal (e.g., one of an internal OSC or an external clock signal, such as, for example, CLK and/or SCK, etc.) associated with the MEMS sensor. For instance, exemplary methods 1600 can comprise determining whether a start symbol, a stop symbol, a digital zero, or a digital one is included in the signal. In addition, exemplary methods 1600 can comprise determining that the control signal comprises a digital high signal or a digital low signal over a multiple of a pilot signal (e.g., pilot signal 716, pilot signal 1014, etc.), wherein the pilot signal has a dynamic reference pulse width based on a predetermined number of cycles of the clock signal (e.g., one of an internal OSC or an external clock signal, such as, for example, CLK and/or SCK, etc.). In addition, exemplary methods 1600 can comprise, at 1610, reading or writing data from or to one or more registers associated with the MEMS sensor (e.g., comprising one or more of exemplary MEMS acoustic sensor 102/202/302/402/502, other sensors, etc.) based on the control symbol (e.g., control symbol 602, control symbol 606, etc.).

Figure 17:
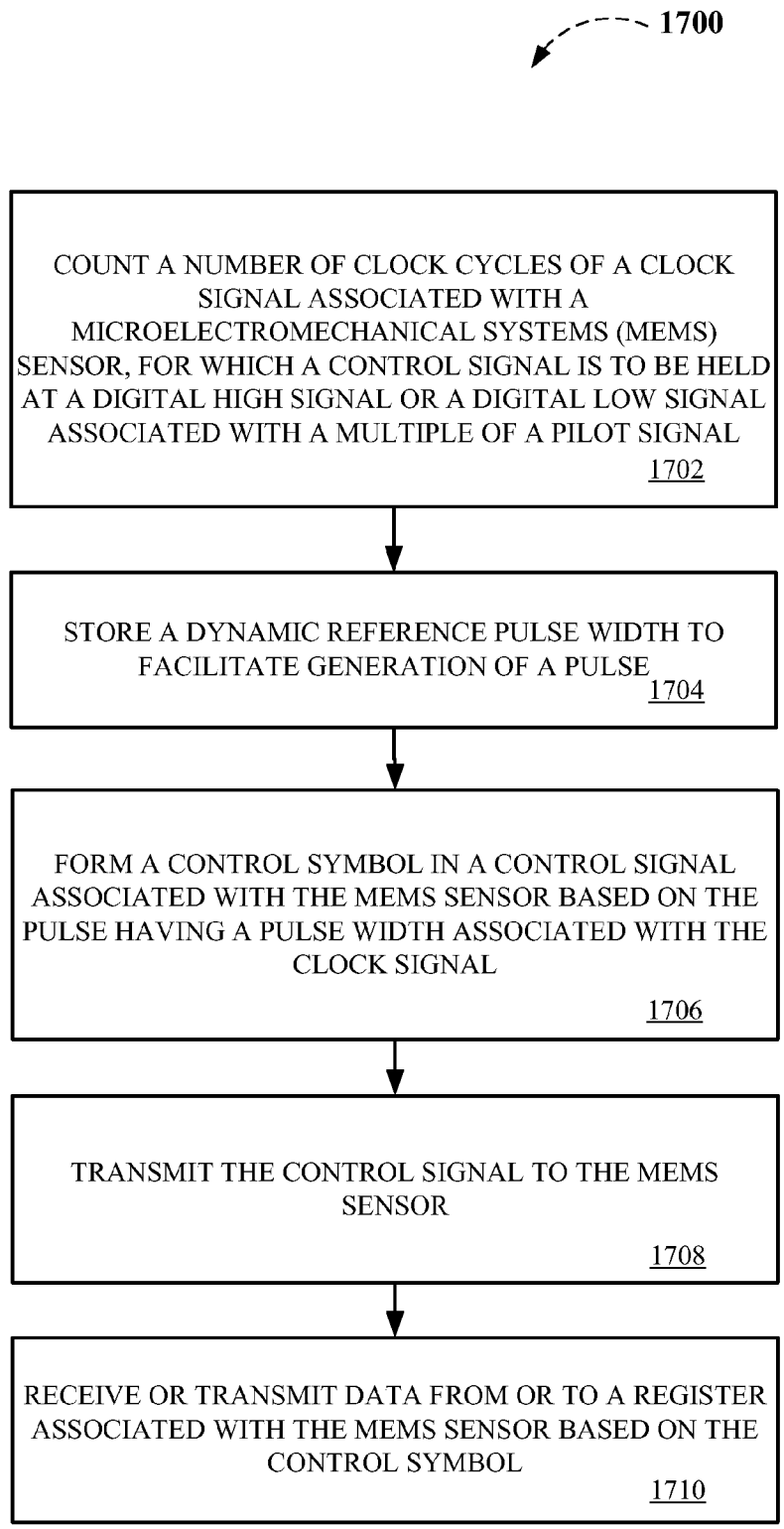
FIG. 17 provides a further flow diagram of non-limiting methods associated with an external controller, according to various embodiments.

FIG. 17 provides a further flow diagram of non-limiting methods 1700 associated with an external controller (e.g., any of external controller 108/208/308/408/508, etc., and/or portions thereof, etc.), according to various embodiments. For example, at 1702, methods 1700 can comprise counting a number of clock cycles associated with a clock signal (e.g., one of an internal OSC or an external clock signal, such as, for example, CLK and/or SCK, etc.), for which a control signal is to be held at a digital high signal or a digital low signal associated with a multiple of a pilot signal (e.g., pilot signal 716, pilot signal 1014, etc.). In addition, exemplary method 1700 can further comprise storing a dynamic reference pulse width at 1704 to facilitate generating a pulse, as described herein, for example, regarding FIGS. 1-11 and 14, etc.

In addition, at 1706, methods 1700 can further comprise forming, by a system (e.g., host system 1300, any of external controller 108/208/308/408/508, exemplary external controller 1402, and/or portions thereof, etc.) comprising a processor, a control symbol (e.g., control symbol 602, control symbol 606, etc.) in a control signal associated with a MEMS sensor (e.g., comprising one or more of exemplary MEMS acoustic sensor 102/202/302/402/502, other sensors, etc.) based on generating a pulse having a pulse width associated with a clock signal (e.g., one of an internal OSC or an external clock signal, such as, for example, CLK and/or SCK, etc.) related to the MEMS sensor. For instance, exemplary methods 1700 can further comprise encoding a start symbol, a stop symbol, a digital zero, or a digital one in the control signal. In addition, exemplary methods 1700 can comprise generating a digital high signal or a digital low signal over a multiple of a pilot signal (e.g., pilot signal 716, pilot signal 1014, etc.), wherein the pilot signal has a dynamic reference pulse width based on a predetermined number of cycles of the clock signal.

In addition, at 1708 methods 1700 can further comprise transmitting the control signal to the MEMS sensor (e.g., comprising one or more of exemplary MEMS acoustic sensor 102/202/302/402/502, other sensors, etc.), wherein a pin (e.g., existing pin 112/212/312/412/512 or CONFIG pin of an I²S digital MEMS acoustic sensor) of the MEMS sensor can be configured to transmit or receive a signal (e.g., OUTPUT, L/R select, CONFIG, etc.) in addition to signals associated with the control signal. At 1710, methods 1700 can also comprise receiving or transmitting data from or to one or registers associated with the MEMS sensor (e.g., comprising one or more of exemplary MEMS acoustic sensor 102/202/302/402/502, other sensors, etc.) based on the control symbol (e.g., control symbol 602, control symbol 606, etc.).

However, various exemplary implementations of exemplary methods 1500, 1600, and/or 1700 as described can additionally, or alternatively, include other process steps associated with features or functionality of MEMS sensors, MEMS acoustic sensor, microphones, sensors or microphone packages, and so on, as further detailed herein, for example, regarding FIGS. 1-14, 18, etc.

What has been described above includes examples of the embodiments of the subject disclosure. It is, of course, not possible to describe every conceivable combination of configurations, components, and/or methods for purposes of describing the claimed subject matter, but it is to be appreciated that many further combinations and permutations of the various embodiments are possible. Accordingly, the claimed subject matter is intended to embrace all such alterations, modifications, and variations that fall within the spirit and scope of the appended claims. While specific embodiments and examples are described in subject disclosure illustrative purposes, various modifications are possible that are considered within the scope of such embodiments and examples, as those skilled in the relevant art can recognize. For example, while embodiments of the subject disclosure are described herein in the context of MEMS sensors (e.g., such as MEMS acoustic sensors, etc.), it can be appreciated that the subject disclosure is not so limited. For instance, as further detailed below, various exemplary implementations can be applied to other areas of electronic control interfaces, protocols, devices, systems, and methods, without departing from the subject matter described herein.

As an example, various aspects of the above-described control interfaces, protocols, devices and/or systems can be employed in the context of other electronic components, such as integrated circuits, or portions thereof, where it is desired to provide the ability to control and/or configure such components or portions thereof, whether the components or portions thereof are limited by pin count or otherwise. As a further non-limiting example, consider a system comprising an ADC, where it is desirable to perform some aspect of system or component control or configuration (e.g., calibrate overall system gain by controlling or configuring internal gain of the ADC, etc.). Further possibilities for application of the described control interfaces, protocols, devices, and/or systems can be appreciated by reference to FIGS. 18-19 below.

Figure 18:
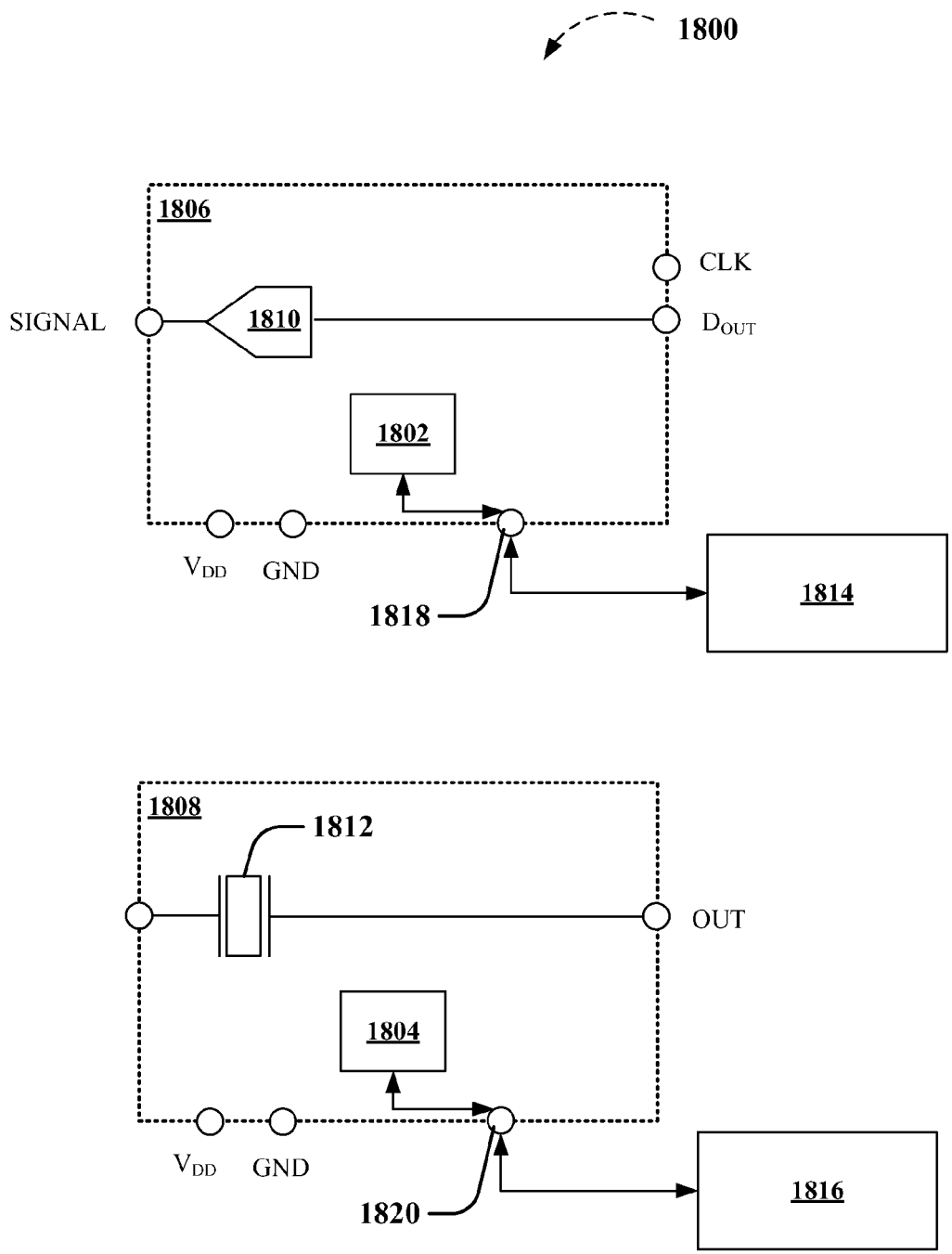
FIG. 18 depicts aspects of further exemplary implementations comprising control interface components in the context of control interfaces employed with exemplary integrated circuits.

Accordingly, FIG. 18 depicts aspects of further exemplary implementations 1800 comprising control interface components in the context of control interfaces employed with exemplary integrated circuits. For example, FIG. 18 depicts aspects of exemplary implementations 1800 comprising control interface components 1802/1804 in the context of, and internal to, integrated circuits 1806 and 1808 comprising an ADC 1810 and oscillator 1812, respectively. Thus, rather than comprise a MEMS transducer as with FIGS. 1-5 above, non-limiting implementations 1800 can comprise an integrated circuit (e.g., integrated circuit 1806 comprising ADC 1810, integrated circuit 1808 comprising oscillator 1812, etc.), and a control interface component 1802/1804, for example. Further non-limiting implementations 1800 can also comprise an external controller 1814/1816, for example, as further described above regarding FIGS. 1-5.

Exemplary control interface component 1802/1804 is depicted coupled to a signal line via existing pin 1818/1820 for communication of an integrated circuit (e.g., integrated circuit 1806 comprising ADC 1810, integrated circuit 1808 comprising oscillator 1812, etc.), for example, with external controller 1814/1816. For instance, an existing pin 1818/1820 can provide a control pin for receiving control signals, as further described herein. In addition, in non-limiting aspects of exemplary implementations 1800 of FIG. 18, exemplary control interfaces and associated protocols as described herein in connection with a control pin comprising existing pin 1818/1820 can provide control interfaces to one or more integrated circuits (e.g., integrated circuit 1806 comprising ADC 1810, integrated circuit 1808 comprising oscillator 1812, etc.) with no influence to digital MEMS acoustic sensor 302/402, during normal operations.

For example, during normal operation of an integrated circuit (e.g., integrated circuit 1806 comprising ADC 1810, integrated circuit 1808 comprising oscillator 1812, etc.), a control pin comprising existing pin 1818/1820 can be held low or high as might be the convention for the particular part. Thus, until and unless a control signal comprising a control symbol as described herein is written (e.g., by external controller 1814/1816, etc.) to existing pin 1818/1820, and/or determined by control interface component 1802/1804, in connection with exemplary control interfaces and associated protocols as described herein, normal operation for one or more integrated circuits (e.g., integrated circuit 1806 comprising ADC 1810, integrated circuit 1808 comprising oscillator 1812, etc.) holding existing pin 1818/1820 low or high would not invoke a register read/write operation. When communication with one or more integrated circuits (e.g., integrated circuit 1806 comprising ADC 1810, integrated circuit 1808 comprising oscillator 1812, etc.) is desired, one or more predefined control symbols can be written to and/or determined to exist on existing pin 1818/1820, the one or more integrated circuits (e.g., integrated circuit 1806 comprising an ADC 1810, integrated circuit 1808 comprising an oscillator 1812, etc.) can enter into a test, configuration, or other mode, as prescribed by the exemplary control interfaces and associated protocols.

As described above regarding FIGS. 1-5, for example, non-limiting implementations 1800 of the subject disclosure described herein can provide an synchronous and/or asynchronous data transmission protocols in connection with control interfaces and associated protocols in the context of one or more integrated circuits (e.g., integrated circuit 1806 comprising ADC 1810, integrated circuit 1808 comprising oscillator 1812, etc.), for example. As described above regarding FIGS. 1-5, while control interface component 1802/1804 is depicted internal to the one or more integrated circuits (e.g., integrated circuit 1806 comprising ADC 1810, integrated circuit 1808 comprising oscillator 1812, etc.), respectively, it can be appreciated that control interface component 1802/1804 can be external to the one or more integrated circuits (e.g., integrated circuit 1806 comprising ADC 1810, integrated circuit 1808 comprising oscillator 1812, etc.), respectively. Furthermore, control interface component 306 can also be connected in parallel (not shown) with existing pin 312 while remaining external to digital MEMS acoustic sensor 302.

The above provided examples involving the one or more integrated circuits (e.g., integrated circuit 1806 comprising an ADC 1810, integrated circuit 1808 comprising an oscillator 1812, etc.) illustrate the flexibility of the exemplary control interfaces, protocols, devices, systems, and methods, as described herein, which enables the control and/or configuration of electronic parts and/or associated systems. For example, in the exemplary non-limiting case of an integrated circuit (e.g., integrated circuit 1806 comprising ADC 1810) shown comprising essential pins that such an integrated circuit might require (e.g., power ($V_{DD}$), ground (GND), analog input signal (SIGNAL), digital (serial) output pin ($D_{OUT}$), and clock (CLK) input pins), various non-limiting aspects as described herein can facilitate calibration of the overall gain of the system (e.g., a system comprising integrated circuit 1806 that comprises ADC 1810) by varying some internal gain controls of the integrated circuit (e.g., integrated circuit 1806 comprising ADC 1810).

In a further non-limiting example, an exemplary system (e.g., a system comprising integrated circuit 1806 that comprises ADC 1810) could also comprise a master controller (not shown) (e.g., control interface component 1802, external controller 1814, portions and/or combinations thereof, or otherwise, etc.) in the exemplary system comprising integrated circuit 1806 that comprises ADC 1810. Thus, the master controller could facilitate initiating a system calibration after startup, for example, to determine (e.g., determined based on system metrics, parameters, etc.), an appropriate ADC input gain to facilitate configuring and/or optimizing an aspect of system performance. In a non-limiting aspect, such a system calibration can be a one-time calibration, in which case the master controller could retain information related to the calibration in a non-volatile memory, which could be employed subsequently to facilitate configuring the integrated circuit 1806 comprising ADC 1810 via the control interfaces and associated protocols as described herein after power up. In a further non-limiting aspect, such a system calibration could take place every time the system is powered up. Accordingly, the master controller can facilitate initiating a system calibration after the system power up. As a result, after determining how the ADC input gain is to be changed, the master controller could cycle the power to just the ADC (e.g., turn the ADC power off and then on again) to establish communications and then program the necessary information into the ADC.

In yet another non-limiting example, exemplary control interfaces and associated protocols, as described herein, can also facilitate a one-time configuration and/or programming of the one or more integrated circuits (e.g., integrated circuit 1806 comprising an ADC 1810, integrated circuit 1808 comprising an oscillator 1812, etc.) at a factory or manufacturer. As a non-limiting example, exemplary control interfaces and associated protocols, as described herein, can also facilitate configuring and/or programming a part design into different products by programming a one-time, programmable (OTP) memory to facilitate final configuration of the project based on the part design.

As a result, exemplary control interfaces and associated protocols, as described herein, can facilitate minimizing costs and/or maximizing revenue from one part design by offering, for example, different price/performance points for products employing the same part design, altering some other characteristics products related to part design (e.g., configure full scale input voltage, enable or disable features, adjust performance versus power tradeoffs, adjust signal gains, tune oscillator frequencies, perform frequency equalization to nullify unwanted frequency response characteristics elsewhere in the system, trim voltage offsets, etc.), and so on, either via a master controller, as described above, via a one-time configuration and/or programming of the integrated circuit at a factory or manufacturer, and/or any combination thereof.

While for purposes of illustration, and not limitation, FIG. 18 provides exemplary implementations 1800 comprising control interface components 1802/1804 in the context of, and internal to, integrated circuits 1806 and 1808 comprising an ADC 1810 and oscillator 1812, respectively, the exemplary control interfaces and associated protocols are not so limited. For example, the exemplary control interfaces and associated protocols can be employed in other contexts involving other integrated circuits (e.g., data converters such as ADCs and digital to analog converters (DACs), oscillators, amplifiers, op amps), as well as in other systems involving and/or associated with MCUs, DSPs, systems-on-a-chip (SOCs), and so on, to facilitate controlling and/or configuring peripherals such as integrated circuits, transducers, etc.

Accordingly, as described above regarding FIGS. 12 and 18, the subject disclosure provides an exemplary integrated circuit comprising an exemplary control interface component, as further described herein. For instance, an exemplary control interface component can comprise any of the control interface components 1802/1804, etc., and/or portions thereof, as further described above. As further described herein, exemplary control interface component 1802/1804 can comprise one or more of an interface component configured to receive a control signal associated with one or more integrated circuits (e.g., integrated circuit 1806 comprising ADC 1810, integrated circuit 1808 comprising oscillator 1812, etc.), a processing component configured to determine whether a control symbol (e.g., control symbol 602, control symbol 606, etc.) is present in the control signal based on a width of a pulse associated with the control signal and a clock signal associated with the one or more integrated circuits (e.g., integrated circuit 1806 comprising ADC 1810, integrated circuit 1808 comprising oscillator 1812, etc.), and/or a controller component configured to control operations related to the one or more integrated circuits (e.g., integrated circuit 1806 comprising ADC 1810, integrated circuit 1808 comprising oscillator 1812, etc.) based on the control symbol, for example, as further described herein.

For example, an exemplary interface component can comprise components and/or circuitry for data and/or clock conditioning, which can facilitate, for example, conditioning signals for digital data signaling. As a further non-limiting example, an exemplary processing component can comprise processing functionality provided by one or more of an MCU, a DSP, an FPGA, and/or an ASIC, and/or portions or combinations thereof. In further non-limiting examples, an exemplary controller component can be coupled between one or more of an exemplary interface component and/or an exemplary processing component and one or more registers coupled to the one or more integrated circuits (e.g., integrated circuit 1806 comprising ADC 1810, integrated circuit 1808 comprising oscillator 1812, etc.). Accordingly, the exemplary controller component can be further configured to read or write data from or to one or more registers associated with the one or more integrated circuits (e.g., integrated circuit 1806 comprising ADC 1810, integrated circuit 1808 comprising oscillator 1812, etc.), for example, based on the control symbol in the control signal, as described herein. In addition, the exemplary processing component can be further configured to determine whether one or more of a start symbol, a stop symbol, a digital zero, or a digital one is included in the control signal, and can be configured to determine a dynamic reference pulse width associated with a pilot signal being high or low for a predetermined number of cycles of the clock signal by counting a number of clock cycles associated with the clock signal, for which the control signal is held at the digital high signal or the digital low signal, as further described herein.

In addition, the exemplary control interface component can further comprise or be associated with a storage component (e.g., comprising a memory such as a nonvolatile memory, one or more registers, etc.) configured to, for example, store a dynamic reference pulse width (e.g., associated with a pilot signal, etc.) to facilitate a determination of whether the control symbol (e.g., control symbol 602, control symbol 606, etc.) is included in the control signal, for example, where the dynamic reference pulse width can be employed in exemplary control interfaces and associated protocols based on pulse-width detection, as further described herein. In addition, exemplary storage component can be further configured to facilitate employing a fast data sampling mode, for example, as further described herein. By way of illustration, and not limitation, the exemplary storage component can comprise or be associated with a nonvolatile memory that can include ROM, PROM, EPROM, EEPROM, OTP memory, or flash memory, and can include or be associated with one or more registers as described herein. An exemplary storage component can additionally or alternatively comprise or be associated with a volatile memory that can include RAM, etc., as further described herein.

In addition, one or more of the exemplary interface component, the processing component, the control component, and/or the storage component, and/or portions or combinations thereof can be included in a package comprising an exemplary MEMS sensor the one or more integrated circuits (e.g., integrated circuit 1806 comprising ADC 1810, integrated circuit 1808 comprising oscillator 1812, etc.), and can include or be integrated, in whole or in part, with an ASIC and/or components and/or circuitry associated with the one or more integrated circuits (e.g., integrated circuit 1806 comprising ADC 1810, integrated circuit 1808 comprising oscillator 1812, etc.), and/or portions thereof.

Figure 19:
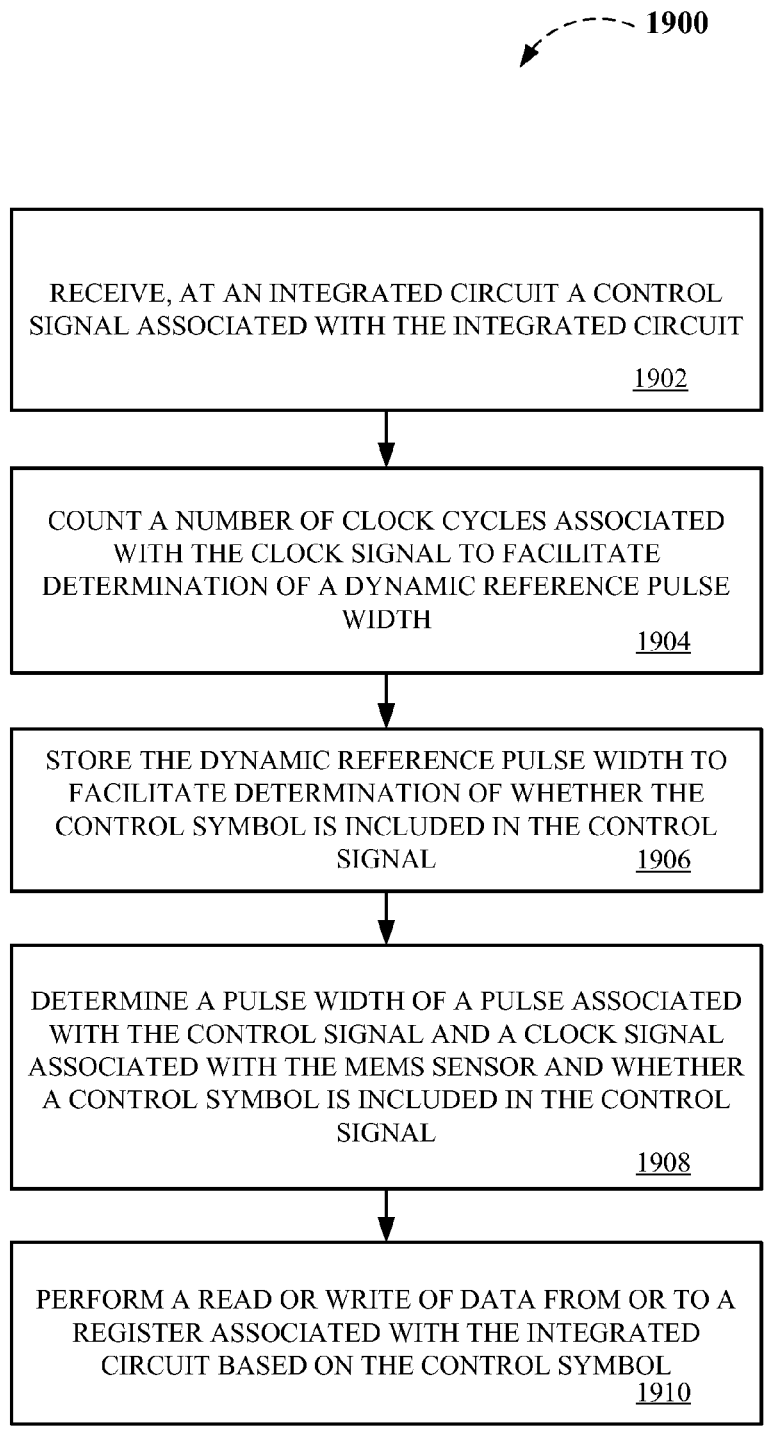
FIG. 19 provides another flow diagram of exemplary methods associated with an integrated circuit according to further non-limiting embodiments.

FIG. 19 provides another flow diagram of exemplary methods 1900 associated with an integrated circuit (e.g., exemplary control interface component 1802/1804, components or portions thereof, etc.) according to further non-limiting embodiments. For instance, at 1902, exemplary methods 1900 can comprise receiving, at an integrated circuit (e.g., exemplary control interface component 1802/1804, components or portions thereof, etc.) of one or more integrated circuits (e.g., integrated circuit 1806 comprising ADC 1810, integrated circuit 1808 comprising oscillator 1812, etc.) a control signal associated with the one or more integrated circuits (e.g., integrated circuit 1806 comprising ADC 1810, integrated circuit 1808 comprising oscillator 1812, etc.), wherein a pin (e.g., existing pin 1818/1820) of the one or more integrated circuits (e.g., integrated circuit 1806 comprising ADC 1810, integrated circuit 1808 comprising oscillator 1812, etc.) is configured to transmit or receive a signal in addition to signals associated with the control signal.

In addition, exemplary methods 1900 can further comprise determining (e.g., via exemplary control interface component 1802/1804, components or portions thereof, etc.) the dynamic reference pulse width by counting a number of clock cycles associated with the clock signal (e.g., one of an internal OSC or an external clock signal, such as, for example, CLK, etc.), for which the control signal is held at the digital high signal or the digital low signal, at 1904. Exemplary methods 1900 can further comprise, at 1906, storing (e.g., via exemplary control interface component 1802/1804, components or portions thereof, etc.), in a memory associated with the integrated circuit, the dynamic reference pulse width to facilitate the determining whether the control symbol is included in the control signal, as described herein, for example, regarding FIGS. 1-14, 18, etc.

At 1908, exemplary methods 1900 can further comprise determining (e.g., via exemplary control interface component 1802/1804, components or portions thereof, etc.) whether a control symbol (e.g., control symbol 602, control symbol 606, etc.) is included in the control signal based on determining a pulse width of a pulse associated with the control signal and a clock signal (e.g., one of an internal OSC or an external clock signal, such as, for example, CLK, etc.) associated with the one or more integrated circuits (e.g., integrated circuit 1806 comprising ADC 1810, integrated circuit 1808 comprising oscillator 1812, etc.). For instance, exemplary methods 1900 can comprise determining whether a start symbol, a stop symbol, a digital zero, or a digital one is included in the signal. In addition, exemplary methods 1900 can comprise determining that the control signal comprises a digital high signal or a digital low signal over a multiple of a pilot signal (e.g., pilot signal 716, pilot signal 1014, etc.), wherein the pilot signal has a dynamic reference pulse width based on a predetermined number of cycles of the clock signal (e.g., one of an internal OSC or an external clock signal, such as, for example, CLK, etc.). In addition, exemplary methods 1900 can comprise, at 1910, reading or writing data from or to one or more registers associated with the one or more integrated circuits (e.g., integrated circuit 1806 comprising ADC 1810, integrated circuit 1808 comprising oscillator 1812, etc.) based on the control symbol (e.g., control symbol 602, control symbol 606, etc.).

As used in this application, the terms "component," "module," "device" and "system" are intended to refer to a computer-related entity, either hardware, a combination of hardware and software, software, or software in execution. As one example, a component or module can be, but is not limited to being, a process running on a processor, a processor or portion thereof, a hard disk drive, multiple storage drives (of optical and/or magnetic storage medium), an object, an executable, a thread of execution, a program, and/or a computer. By way of illustration, both an application running on a server and the server can be a component or module. One or more components or modules scan reside within a process and/or thread of execution, and a component or module can be localized on one computer or processor and/or distributed between two or more computers or processors.

As used herein, the term to "infer" or "inference" refer generally to the process of reasoning about or inferring states of the system, and/or environment from a set of observations as captured via events, signals, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word, "exemplary," is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while an aspect may have been disclosed with respect to only one of several embodiments, such feature may be combined with one or more other features of the other embodiments as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A device, comprising:
   a package comprising a microelectromechanical systems (MEMS) transducer associated with a clock signal;
   at least one register associated with the MEMS transducer; and
   a pin of the package configured to at least one of transmit or receive a signal, wherein the pin is further configured to at least one of transmit or receive a control signal, wherein the control signal is configured to control the MEMS transducer based on a determination that a control symbol included in the signal, and wherein the determination that the control symbol is based on detection of a pulse width of a pulse associated with the signal and the clock signal, wherein the pulse is based on the signal being at a high value or low value for a dynamic number of cycles of the clock signal.

2. The device of claim 1, wherein the MEMS transducer comprises a MEMS acoustic sensor.

3. The device of claim 2, wherein the control symbol comprises at least one of a start symbol, a stop symbol, a digital zero, or a digital one.

4. The device of claim 2, wherein the control signal is further configured to at least one of read or write data from or to the at least one register.

5. The device of claim 2, wherein the control signal is further configured to allow data associated with the MEMS transducer to be sampled in each clock cycle associated with the clock signal.

6. The device of claim 1, wherein the signal held at a predetermined value for the dynamic number of cycles of the clock signal comprises a pilot signal that has a dynamic reference pulse width and wherein the pulse width is defined as a multiple of the pilot signal.

7. The device of claim 6, wherein the predetermined value comprises at least one of a digital high signal or a digital low signal.

8. The device of claim 6, wherein the dynamic reference pulse width comprises a selected number of clock cycles associated with the clock signal that the signal is held at the predetermined value.

9. A method, comprising:
   receiving a control signal at a package comprising a microelectromechanical systems (MEMS) transducer that has an associated clock signal, wherein the control signal is received at a pin of the package configured to at least one of transmit or receive at least one signal in addition to receiving the control signal;

determining whether a control symbol is included in the control signal, wherein the determining whether the control symbol is included in the signal further comprises determining a pulse width of a pulse associated with the control signal and the associated clock signal; and performing at least one operation associated with the MEMS transducer based on the control symbol.

10. The method of claim 9, wherein the receiving the control signal comprises receiving the control signal at the package comprising a MEMS microphone.

11. The method of claim 9, wherein the determining whether the control symbol is included in the control signal further comprises determining whether at least one of a start symbol, a stop symbol, a digital zero, or a digital one is included in the control signal.

12. The method of claim 9, wherein the performing the at least one operation comprises performing at least one of reading or writing data from or to at least one register associated with the MEMS transducer.

13. The method of claim 9, wherein the performing the at least one operation comprises enabling sampling of data associated with the MEMS transducer in each clock cycle of the associated clock signal.

14. The method of claim 9, further comprising:
determining that the control signal comprises at least one of a digital high signal or a digital low signal for a multiple of a pilot signal, wherein the pilot signal has a dynamic reference pulse width based on a predetermined number of cycles of the associated clock signal.

15. The method of claim 14, further comprising:
determining the dynamic reference pulse width by counting a number of clock cycles of the associated clock signal, for which the control signal is held at the digital high signal or the digital low signal.

16. The method of claim 15, further comprising:
storing the dynamic reference pulse width to facilitate the determining whether the control symbol is included in the control signal.

17. A method, comprising:
receiving, at an integrated circuit associated with a microelectromechanical systems (MEMS) sensor, a control signal associated with the MEMS sensor, wherein a pin of the MEMS sensor is configured to at least one of transmit or receive at least one signal in addition to signals associated with the control signal;

determining whether a control symbol is included in the control signal based on determining a pulse width of a pulse associated with the control signal and a clock signal associated with the MEMS sensor, wherein the determining the pulse width comprises determining that the control signal comprises at least one of a digital high signal or a digital low signal over a multiple of a pilot signal, wherein the pilot signal has a dynamic reference pulse width based on a predetermined number of cycles of the clock signal; and performing at least one of reading or writing data from or to at least one register associated with the MEMS sensor based on the control symbol.

18. The method of claim 17, wherein the determining whether the control symbol is included in the control signal further comprises determining whether at least one of a start symbol, a stop symbol, a digital zero, or a digital one is included in the control signal.

19. The method of claim 17, further comprising:
determining the dynamic reference pulse width by counting a number of clock cycles associated with the clock signal, for which the control signal is held at the digital high signal or the digital low signal.

20. The method of claim 17, further comprising:
storing, in a memory associated with the integrated circuit, the dynamic reference pulse width to facilitate the determining whether the control symbol is included in the control signal.

21. An integrated circuit, comprising:
an interface component configured to receive a control signal associated with a microelectromechanical systems (MEMS) sensor;

a processing component configured to determine whether a control symbol is present in the control signal based on a width of a pulse associated with the control signal and a clock signal associated with the MEMS sensor, wherein the width of the pulse represents at least one of a start symbol, a stop symbol, a digital zero, or a digital one based on the width of the pulse being a predetermined multiple of a pilot signal width, wherein the pilot signal has a dynamic reference pulse width based on a predetermined number of cycles of the clock signal, and wherein the processing component is further configured to determine the dynamic reference pulse width by counting a number of clock cycles associated with the clock signal, for which the control signal is held at the digital high signal or the digital low signal; and a controller component configured to control operations related to the MEMS sensor based on the control symbol.

22. The integrated circuit, of claim 21, wherein the controller component is further configured to read or write data from or to at least one register associated with the MEMS sensor based on the control symbol.

23. The integrated circuit, of claim 21, wherein the processing component is further configured to determine whether at least one of a start symbol, a stop symbol, a digital zero, or a digital one is included in the control signal.

24. The integrated circuit, of claim 21, further comprising:
a storage component comprising a memory configured to store the dynamic reference pulse width to facilitate a determination of whether the control symbol is included in the control signal.

* * * * *